US012719779B2

(12) United States Patent
Xiong

(10) Patent No.: US 12,719,779 B2
(45) Date of Patent: Aug. 25, 2026

(54) INFORMATION TRANSMISSION METHOD AND APPARATUS, AND COMMUNICATION DEVICE AND STORAGE MEDIUM

(71) Applicant: Beijing Xiaomi Mobile Software Co., Ltd., Beijing (CN)

(72) Inventor: Yi Xiong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 302 days.

(21) Appl. No.: 18/580,735

(22) PCT Filed: Jul. 21, 2021

(86) PCT No.: PCT/CN2021/107706

§ 371 (c)(1),
(2) Date: Jan. 19, 2024

(87) PCT Pub. No.: WO2023/000229

PCT Pub. Date: Jan. 26, 2023

(65) Prior Publication Data

US 2024/0372796 A1 Nov. 7, 2024

(51) Int. Cl.
*H04L 43/16* (2022.01)
*H04L 41/16* (2022.01)
*H04W 72/04* (2023.01)

(52) U.S. Cl.
CPC .............. *H04L 43/16* (2013.01); *H04L 41/16* (2013.01); *H04W 72/04* (2013.01)

(58) Field of Classification Search
CPC ......... H04L 43/16; H04L 41/16; H04W 72/04
See application file for complete search history.

(56) References Cited

U.S. PATENT DOCUMENTS

2021/0006989 A1 1/2021 Lee et al.
2022/0150727 A1* 5/2022 Pezeshki ............... H04W 24/08
2022/0335337 A1* 10/2022 Kovács ................... H04W 8/24

FOREIGN PATENT DOCUMENTS

CN 106559872 A 4/2017
CN 111615141 A 9/2020
CN 111642011 A 9/2020
CN 112105046 A 12/2020
CN 112514441 A 3/2021
EP 3897033 A1 * 10/2021 ............ H04W 28/18
WO WO 2020/080989 A1 4/2020
WO WO 2020/121501 A1 6/2020

(Continued)

OTHER PUBLICATIONS

International Search Report of International Application No. PCT/CN2021/107706, dated Apr. 19, 2022, 4 pages.

(Continued)

*Primary Examiner* — Gbemileke J Onamuti
(74) *Attorney, Agent, or Firm* — Finnegan, Henderson, Farabow, Garrett & Dunner, L.L.P.

(57) ABSTRACT

A method for transmitting information is performed by a User Equipment (UE), and includes: receiving control information, wherein the control information is at least configured to control an operation of a first prediction model in the UE, and the first prediction model is configured to obtain a prediction result of Radio Resource Management (RRM).

19 Claims, 3 Drawing Sheets

(56) References Cited

FOREIGN PATENT DOCUMENTS

| | | | |
|---|---|---|---|
| WO | 2020139181 | A1 | 7/2020 |
| WO | WO 2021/112360 | A1 | 6/2021 |

OTHER PUBLICATIONS

3GPP TS 38.300 V17.6.0 (Sep. 2023); 3rd Generation Partnership Project; Technical Specification Group Radio Access Network; NR; NR and NG-RAN Overall Description; Stage 2 (Release 17).

3GPP TS 38.331 V17.6.0 (Sep. 2023); 3rd Generation Partnership Project; Technical Specification Group Radio Access Network; NR; Radio Resource Control (RRC) protocol specification (Release 17).

Chinese Office Action for CN Application No. 202180002219.3, dated Jun. 1, 2025.

Chinese Office Action for CN Application No. 202180002219.3, dated Nov. 11, 2025.

Qualcomm, "Email discussion summary for [RAN-R18-WS-crossFunc-Qualcomm]", 3GPP TSG RAN Rel-18 workshop, RWS-210637, Electronic Meeting, Jun. 28-Jul. 2, 2021.

* cited by examiner

INFORMATION TRANSMISSION METHOD AND APPARATUS, AND COMMUNICATION DEVICE AND STORAGE MEDIUM

CROSS-REFERENCE

The present application is a U.S. National Stage of International Application No. PCT/CN2021/107706, filed on Jul. 21, 2021, the content of which is incorporated herein by reference in its entirety.

TECHNICAL FIELD

The present disclosure relates to, but is not limited to, the field of wireless communication technologies, and in particular to a method and apparatus for transmitting information, a communication device and a storage medium.

BACKGROUND

In a mobile communication system, movement of a User Equipment (UE) causes a channel condition around it to change all the time. In order to support mobility of the UE and obtain the channel condition of a current surrounding cell of the UE in a timely manner, a network configures the UE to perform a Radio Resource Management (RRM) measurement. An idle UE and an inactive UE autonomously perform cell selection or cell reselection based on a RRM measurement result, and a connected UE reports the RRM measurement result to the network to assist the network in making a cell handover decision. During a measurement process of the connected UE, a network of a New Radio (NR) system sends measurement configuration information to the connected UE through a RRC signaling, and the UE performs intra frequency/inter frequency/inter-Radio Access Technology (RAT) measurement according to the measurement configuration information, and then reports a measurement result to the network.

SUMMARY

Embodiments of the present disclosure provide a method and apparatus for transmitting information, a communication device and a storage medium.

According to a first aspect of embodiments of the present disclosure, there is provided a method for transmitting information, wherein the method is performed by a UE, and includes:

receiving control information, wherein the control information is at least configured to control an operation of a first prediction model in the UE, and the first prediction model is configured to obtain a prediction result of RRM.

According to a second aspect of embodiments of the present disclosure, there is provided a method for transmitting information, wherein the method is performed by an access network device, and includes:

sending control information, wherein the control information is at least configured to control an operation of a first prediction model in a UE, and the first prediction model is configured to obtain a prediction result of RRM.

According to a third aspect of embodiments of the present disclosure, there is provided an apparatus for transmitting information, wherein the apparatus includes:

a receiving module, configured to receive control information, wherein the control information is at least configured to control an operation of a first prediction model in a UE, and the first prediction model is configured to obtain a prediction result of RRM.

According to a fourth aspect of embodiments of the present disclosure, there is provided an apparatus for transmitting information, wherein the apparatus includes:

a sending module, configured to send control information, wherein the control information is at least configured to control an operation of a first prediction model in a UE, and the first prediction model is configured to obtain a prediction result of RRM.

According to a fifth aspect of embodiments of the present disclosure, there is provided a communication device, including a processor, a memory, and an executable program stored on the memory and capable of being run by the processor, wherein the processor performs a step of the method for transmitting the information as described in the first aspect or the second aspect when running the executable program.

According to a sixth aspect of embodiments of the present disclosure, there is provided a storage medium having an executable program stored thereon, wherein the executable program, when executed by a processor, implements a step of the method for transmitting the information as described in the first aspect or the second aspect.

It should be noted that the above general description and the following detailed description are merely exemplary and explanatory and should not be construed as limiting of the disclosure.

BRIEF DESCRIPTION OF THE DRAWINGS

The accompanying drawings here, which are incorporated in and constitute a part of this specification, illustrate embodiments consistent with the present disclosure and together with the description serve to explain principles of embodiments of the present disclosure.

DETAILED DESCRIPTION

Reference will now be made in detail to embodiments, examples of which are illustrated in the accompanying drawings. The following description refers to the accompanying drawings in which the same numbers in different drawings represent the same or similar elements unless otherwise represented. The implementations set forth in the following description of the embodiments do not represent all implementations consistent with the present disclosure. Instead, they are merely examples of apparatuses and methods consistent with some aspects of the embodiments of the present disclosure as recited in the appended claims.

The terms used in the embodiments of the present disclosure are merely for the purpose of describing particular embodiments and are not intended to limit the embodiments of the present disclosure. As used in the embodiments of the present disclosure and the appended claims, the singular forms "a", "the" and "said" are intended to include the plural forms as well, unless the context clearly indicates otherwise. It should also be understood that the term "and/or" as used herein refers to and includes any or all possible combinations of one or more of the associated listed items.

It should be understood that, although the terms first, second, third, etc. may be used in embodiments of the present disclosure to describe various information, such information should not be limited to these terms. These terms are only used to distinguish the same type of information from each other. For example, without departing from the scope of embodiments of the present disclosure, first information may also be referred to as second information, and similarly, the second information may also be referred to as the first information. Depending on the context, the word "if" as used herein can be interpreted as "upon" or "when" or "in response to determination".

Figure 1:
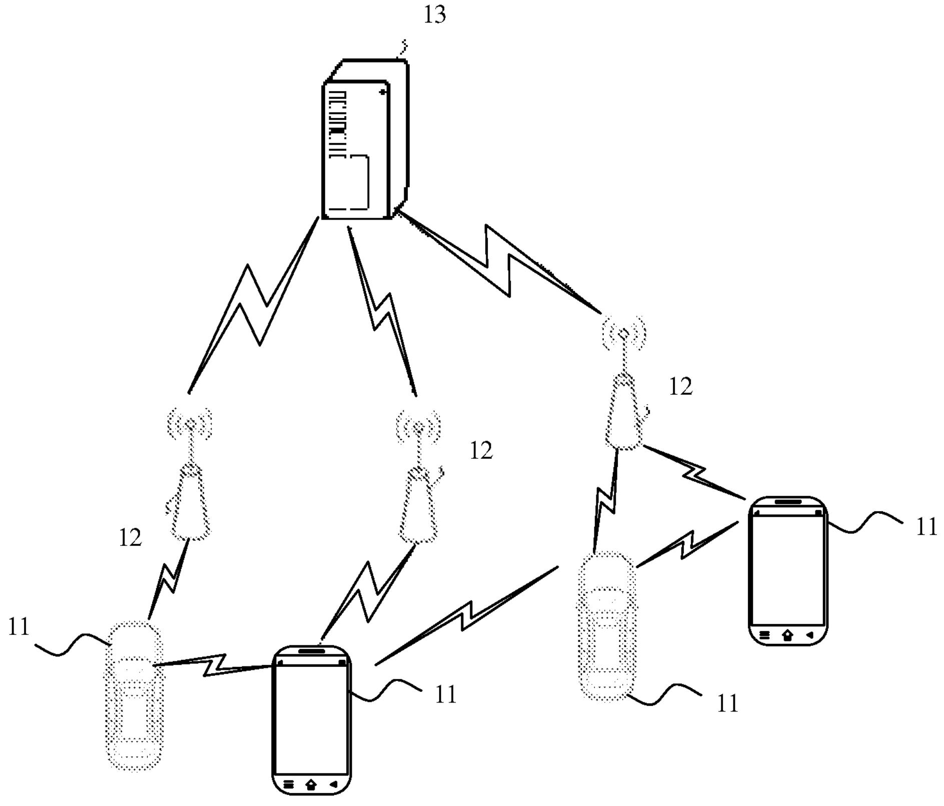
FIG. 1 illustrates a schematic structural diagram of a wireless communication system according to an embodiment of the present disclosure.

Reference is made to FIG. 1, which shows a schematic structural diagram of a wireless communication system provided by an embodiment of the present disclosure. As illustrated in FIG. 1, the wireless communication system is a communication system based on cellar mobile communication technologies. The wireless communication system may include several terminals 11 and several base stations 12.

The terminal 11 may refer to a device that provides voice and/or data connectivity to a user. The terminal 11 may communicate with one or more core networks via a Radio Access Network (RAN). The terminal 11 may be an Internet of Things terminal, such as a sensor device, a mobile phone (or caller "cellular" phone) and a computer with the Internet of Things terminal, for example, may be a fixed, portable, pocket-sized, handheld, built-in computer or vehicle-mounted device. For example, the user equipment may be a station (STA), a subscriber unit, a subscriber station, a mobile station, a mobile, a remote station, an access point, a remote terminal, an access terminal, a user terminal, a user agent, a user device, or a user equipment. Or, the terminal 11 may also be a device of an unmanned aerial vehicle. Or, the terminal 11 may also be a vehicle-mounted device, such as a trip computer with a wireless communication function, or a wireless communication device connected to an external trip computer. Or, the terminal 11 may also be a roadside device, such as a streetlight, a signal light or another roadside device with a wireless communication function.

The base station 12 can be a network-side device in a wireless communication system. The wireless communication system can be a 4th generation mobile communication (4G) system, also known as a Long Term Evolution (LTE) system. Or, the wireless communication system may also be a 5G system, also known as a New Radio (NR) system or a 5G NR system. Or, the wireless communication system may also be a next-generation system of 5G system or a MTC system. An access network in the 5G system can be referred to as a New Generation-Radio Access Network (NG-RAN).

The base station 12 can be an evolved NodeB (eNB) in the 4G system. Or, the base station 12 may also be a gNB with a central distributed architecture in the 5G system. When the base station 12 adopts the central distributed architecture, it usually includes a Central Unit (CU) and at least two Distributed Units (DUs). The CU is provided with a protocol stack of a Packet Data Convergence Protocol (PDCP) layer, a Radio Link Control (RLC) layer, and a Media Access Control (MAC) layer. The DU is provided with a protocol stack of a Physical (PHY) layer. A specific implementation of the base station 12 is not limited in embodiments of the present disclosure.

A wireless connection can be established between the base station 12 and the terminal 11 through a radio air interface. In different implementations, the radio air interface is a radio air interface based on a 4th generation mobile communication network technology (4G) standard. Or, the radio air interface is a radio air interface based on a 5th generation mobile communication network technology (5G) standard, such as the NR. Or, the radio air interface may also be a radio air interface based on a 5G next-generation mobile communication network technology standard.

In some embodiments, an End to End (E2E) connection may also be established between the terminals 11, such as a vehicle to vehicle (V2V) communication, a vehicle to infrastructure (V2I) communication and a vehicle to pedestrian (V2P) communication in a vehicle to everything (V2X) communication, and other scenarios.

In some embodiments, the above wireless communication system may further include a network management device 13.

The several base stations 12 are connected to the network management device 13, respectively. The network management device 13 can be a core network device in the wireless communication system. For example, the network management device 13 can be a Mobility Management Entity (MME) in an Evolved Packet Core (EPC) network. Or, the network management device may also be another core network device, such as a Serving Gateway (SGW), a Public Data Network Gateway (PGW), a Policy And Charging Rules Function (PCRF) unit or a Home Subscriber Server (HSS). An implementation form of the network management device 13 is not limited in embodiments of the present disclosure.

An execution subject involved in embodiments of the present disclosure includes but is not limited to base stations and UEs such as mobile phone terminals that support cellular mobile communications, etc.

An application scenario of embodiments of the present disclosure is that with the progress of society and economic development, users have increasingly high demands for wireless networks, and network deployment has also become increasingly complex. In order to adapt to this change, the wireless networks are also becoming increasingly intelligent. The rapid development of Artificial Intelligence (AI) technologies has further provided technical support for intelligent communication networks. The intelligent communication networks have become an indispensable part of today's life, and accordingly, applying AI technologies to the wireless networks is an inevitable trend.

Machine learning algorithms are one of the most important implementation methods of the artificial intelligence technologies at present. Machine learning can obtain modules through a large amount of training data, and events can be predicted through the modules. In many fields, the modules trained by the machine learning can obtain very accurate prediction results. Network-side-based AI enhancement has been studied in RAN3 and SA.

Although the AI on the network side can obtain more data, the UE can obtain more UE-side information. An AI module on the UE side is more conducive to improving user experience. On the one hand, with the consideration of personal privacy and data volume, it is impossible for the UE to report all information to the network. On the other hand, the network will train a general-purpose module for all UEs instead of customizing the AI module for each UE. The general-purpose module cannot provide the best user experience.

Compared with the AI module on the network side, the AI module on the UE side eliminates the need for the network to store data and calculate the AI module for each UE. The data and the AI module may be maintained locally by the UE without the personal safety concern. The UE can train a customized AI module for the UE through the local data, thereby providing a better user experience.

Since the use of the AI module on the UE side to perform an AI prediction function consumes power, if a starting criteria and a stopping criteria of the UE-side artificial intelligence module are not specified, the UE may be caused to be unable to obtain an AI prediction result when needed, or it may be possible that the UE enables the AI prediction function when it is not needed, which may cause the additional power loss. Therefore, how to reasonably control the starting and the stopping of the AI module, obtain the prediction result in a timely manner, and save the UE power is an issue that needs to be solved urgently.

Figure 2:
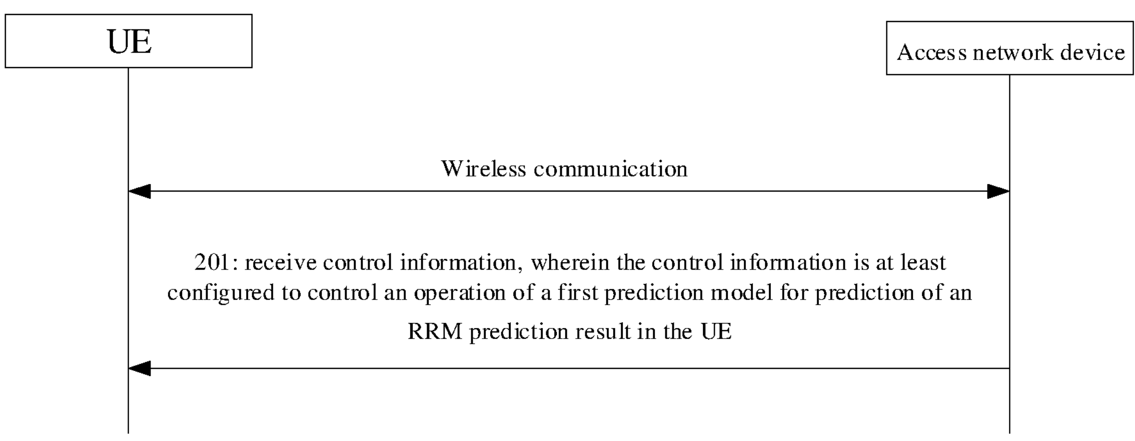
FIG. 2 illustrates a schematic flowchart of a method for transmitting information according to an embodiment of the present disclosure.

As shown in FIG. 2, an embodiment of the present disclosure provides a method for transmitting information. The method for transmitting the information may be applied to a UE in a cellular mobile communication system, and include step 201.

In the step 201, control information is received, and the control information is at least configured to control an operation of a first prediction model in the UE, and the first prediction model is configured to obtain a prediction result of RRM.

Here, the UE may be a mobile phone UE that adopts cellular mobile communication technologies for wireless communication, etc. An access network device may be a base station that provides an access network interface to the UE in the cellular mobile communication system, etc.

The first prediction model may be a machine learning model with learning capabilities, including but not limited to a neural network, etc. The first prediction model may predict RRM-associated information based on historical data and information associated with the RRM (e.g., a position of the UE, mobility information of the UE, historical access information of the UE in one or more cells, etc.), in order to obtain a prediction result.

For example, the first prediction model may be a 3 Convolutional Neural Networks (CNN) model. The 3CNN model may be adopted to predict a Reference Signal Receiving Power (RSRP), etc., in order to obtain the predicted RSRP value, etc. Here, the historical data may be historical data used to determine the prediction result of the RRM, such as a correspondence between a historical RSRP and the UE position, a correspondence between the historical RSRP and a UE speed, etc.

The first prediction model may be run by the UE. Compared with a first prediction model on a network side, the first prediction model run by the UE eliminates the need for the network side to store the data and calculate the first prediction model for each UE. The data and the first prediction model may be maintained locally by the UE. The UE may train a customized AI module for the UE through the local data, thereby providing a better user experience. In addition, the UE may complete the training and prediction of the first prediction model locally without uploading the data with a security requirement, thereby improving the data security. The UE does not need to upload training data, etc. through a radio link, reducing wireless communication load.

The prediction result may be one or more results for different prediction objects. For example, the prediction result may be a plurality of RRM prediction results for different cells, etc.

Here, the access network device may send control information to the UE to control the operation of the first prediction model in the UE. The control information may control the UE to start the first prediction model to predict the prediction result, or control the UE to stop the prediction of the prediction result by the first prediction model. The control information may also be used to provide a judgment threshold for the UE to judge whether to start the first prediction model to predict the prediction result, and/or to stop the prediction of the prediction result by the first prediction model. For example, the control information may indicate a time when the UE starts or stops the operation of the first prediction model, etc.

The control information may also be used to configure the first prediction model, for example, configure a type of a prediction result determined by the first prediction model, etc.

In this way, the access network device controls the operation of the first prediction model in the UE through the control information, thereby realizing the control of the starting and/or the stopping the first prediction model in the UE. The access network device can obtain the prediction result in time according to its own needs; and the additional power loss caused by the continuous or unnecessary operation of the first prediction model is reduced.

In an embodiment of the present disclosure, the control information includes:

a control instruction, and upon being received by the UE, the control instruction is configured to control starting or stopping of the first prediction model; and/or configuration information, including threshold information for controlling the starting and/or the stopping of the first prediction model.

The control instruction may be an instruction that directly controls the UE to start the first prediction model to predict the prediction result, or directly controls the UE to stop the prediction of the prediction result by the first prediction model.

The control instructions may be carried in a RRC signaling, a MAC signaling and/or a DCI signaling. For example, in order to improve the timeliness of the control instruction, the control instructions may be carried in the DCI signaling.

In this way, the access network device may start or stop the operation of the first prediction model in the UE according to its own needs, obtain the prediction result in time when there is a demand, and stop the operation of the first prediction model in time when there is no demand, thereby reducing the resource waste and the power loss caused by the uncontrolled operation of the first prediction model.

The control information may also be used to provide judgement threshold information for the UE to judge and determine to start the first prediction model to predict the prediction result and/or stop the first prediction model to predict the prediction result. The threshold information may be carried in the RRC signaling, the MAC signaling and/or the DCI signaling.

The threshold information may indicate a judgment condition for the UE to start the first prediction model and/or stop the first prediction model. For example, the threshold information may be timing information of a timer. When the timer overflows, the UE starts the first prediction model and/or stops the first prediction model. The threshold information may be state information of the UE, and the threshold information may indicate that; when the UE is in a first state, the UE starts the first prediction model; when the UE is in a second state that is different from the first state, the UE stops the first prediction model. For example, the first state may be a high power state, and the second state may be a low power state.

In this way, through the control information provided by the access network device, the UE can autonomously judge to start or stop the operation of the first prediction model in the UE, which improves the acquisition of the prediction result and improves the autonomy of the UE in controlling the operation of the first prediction model. When there is a demand, the prediction result is timely acquired, and when there is no demand, the operation of the first prediction model is timely stopped, reducing a case of the uncontrolled operation of the first prediction model, and in turn reducing the power loss caused by the uncontrolled operation of the first prediction model.

In an embodiment of the present disclosure, the threshold information indicates at least one of:

- a time threshold, including a time threshold for the starting of the first prediction model and/or a time threshold for the stopping of the first prediction model;
- a position threshold, including a position threshold for the starting of the first prediction model and/or a position threshold for the stopping of the first prediction model;
- a movement speed threshold, including a movement speed threshold for the starting of the first prediction model and/or a movement speed threshold for the stopping of the first prediction model;
- a signal quality threshold, including a signal quality threshold for the starting of the first prediction model and/or a signal quality threshold for the stopping of the first prediction model; and
- a prediction threshold, including a prediction threshold for the starting of the first prediction model and/or a prediction threshold for the stopping of the first prediction model, and the prediction threshold is configured to be compared with a prediction value of a second prediction model.

The time threshold may be used for the UE to compare with a corresponding time parameter, and determine the starting or the stopping of the first prediction model based on a comparison result. The time threshold may include a threshold for determining the starting of the first prediction model and/or a threshold for determining the stopping of the first prediction model. The time parameter may be a time point and/or a duration value or a time range. The time threshold may be a threshold for the time parameter or a threshold for a time parameter change value.

For example, the time threshold may be the time range. The time threshold may indicate the time range through a starting time value and a stopping time value, and the time threshold may also indicate the time range through the starting time value and a running duration.

The position threshold may be used for the UE to compare with the corresponding position parameter, and determine the starting or the stopping of the first prediction model based on a comparison result. The position threshold may include a threshold for determining the staring of the first prediction model and/or a threshold for determining the stopping of the first prediction model. The position parameter may be a relative distance, angle, etc. from a reference point. The position threshold may be a threshold for a specific position parameter or a threshold for a position parameter change value.

For example, the position threshold may be a distance threshold for a distance between the UE and a center position of a serving cell. When the distance between the UE and the center position of the serving cell is less than the distance threshold, the operation of the first prediction model to predict a signal quality of a neighbor cell may be stopped. When the distance between the UE and the center position of the serving cell is greater than the distance threshold, the operation of the first prediction model may be started to predict the signal quality of the neighbor cell to prepare for cell handover.

The movement speed threshold may be used for the UE to compare with the corresponding movement speed parameter, and determine the starting or the stopping of the first prediction model based on a comparison result. The movement speed threshold may include a threshold for determining the staring of the first prediction model and/or a threshold for determining the stopping of the first prediction model. The movement speed threshold may be a threshold for a specific movement speed parameter, or a threshold for a movement speed parameter change value.

For example, when a movement speed of the UE is high, that is, the movement speed is greater than a speed threshold, the first prediction model may be used in advance, due to the frequent cell handover, to predict the signal quality of the neighbor cell, and then a target cell to which needs to be handed over may be predicted in advance, preparing for handover and improving a cell handover efficiency.

The signal quality threshold may be used for the UE to compare with the corresponding signal quality value, and determine the starting or the stopping of the first prediction model based on a comparison result. The signal quality threshold may include a threshold for determining the starting of the first prediction model and/or a threshold for determining the stopping of the first prediction model.

The signal quality value reflects a signal quality (e.g., RSRP or RSPQ, etc.) of a prediction object such as a cell, a frequency point, a beam, etc. The signal quality threshold may be a threshold for a specific signal quality value or a threshold for a signal quality change value.

The network may determine the threshold information based on a precision difference, an energy consumption difference, a resource consumption difference, etc. generated by an actual measurement and the prediction model. For example, the network may start the prediction model in a case that the precision difference between an expected prediction result of the prediction model and the actual measurement is within an acceptable range, and the prediction model has lower resource consumption. Alternatively, the network may stop the prediction model in a case that the precision difference between the expected prediction result of the prediction model and the actual measurement is within an unacceptable range, and the prediction model has higher resource consumption.

In an embodiment of the present disclosure, the signal quality threshold includes a difference threshold between a signal quality value predicted by the first prediction model and an actually measured signal quality value.

The signal quality threshold may be a difference threshold between a signal quality value, within a predetermined time period, predicted by the first prediction model and the actually measured signal quality value.

For example, when an error between a prediction result of a running first prediction model and an actual measurement result is greater than a certain threshold, the first prediction model is stopped.

For example, the first prediction model predicts that an average RSRP of the UE in the subsequent 10 s is a, and after 10 s, the UE determines that an average RSRP obtained through the actual measured RSRP within the 10 s is b, and the error is an absolute value c of a−b. When c is greater than the signal quality threshold, the first prediction model is stopped.

The prediction threshold may be used for the UE to compare with the prediction value of the second prediction model, and determine the starting or the stopping of the first prediction model based on a comparison result. The prediction threshold may include a threshold for determining the starting of the first prediction model and/or a threshold for determining the stopping of the first prediction model.

Here, the first prediction model and the second prediction model may be the same or different. The UE may determine the starting and/or stopping of the first prediction model based on a comparison result of the prediction threshold and the prediction value of the second prediction model. The second prediction model may determine the prediction value before the UE determines the starting and/or stopping of the second prediction model.

The first prediction model may have higher resource consumption and/or power consumption than the second prediction model. In this way, determining whether to activate the first prediction model through the prediction value of the second prediction model may reduce the resource consumption and/or the power consumption caused by directly activating the first prediction model.

For example, the first prediction model may measure the signal quality of the neighbor cell, such as the RSRP. The prediction value of the second prediction model may be the signal quality of the serving cell, such as the RSRP. The prediction threshold is the signal quality threshold of the serving cell. If the RSRP of the serving cell predicted by the second prediction model is less than the prediction threshold (e.g., 1 dBm), the first prediction model is started to predict the RSRP of the neighbor cell. The neighbor cell may include all neighbor cells that the UE can predict, for example, neighbor cells that can be measured or neighbor cells that have stored corresponding historical information.

In an embodiment of the present disclosure, the time threshold, the position threshold, the movement speed threshold, the signal quality threshold and/or the prediction threshold may be used for the UE, through the combinational logic relationship, to determine the starting and/or the stopping of the prediction model.

For example, the time threshold and the position threshold may adopt the logic AND relationship for the UE to determine the starting and/or the stopping of the prediction model. That is, both the time threshold and the position threshold need to be met before the UE can start or stop the prediction model. The logic relationship includes at least; logic AND, and/or logic OR, etc.

In an embodiment of the present disclosure, the time threshold includes at least one of:

a time point threshold; and a time range threshold.

In an embodiment of the present disclosure, the network may configure a starting time point threshold. When a current time reaches the starting time point threshold, the UE starts the first prediction model. The network may also configure a stopping time point threshold. When the current time reaches the stopping time point threshold, the UE stops the first prediction model.

The time point threshold may be represented by the absolute time, such as UTC, a system frame number, or may be represented by a timer. The UE starts the timer when it receives the starting time point threshold, and starts the first prediction model after timeout. Alternatively, the UE starts the timer when it receives the stopping time point threshold, and stops the first prediction model after timeout.

The time range threshold may be a starting time range threshold and/or a stopping time range threshold. In an embodiment of the present disclosure, the network may configure the starting time range threshold, the corresponding first prediction model is started within the starting time range threshold, and the first prediction model is stopped after the starting time range threshold ends. The time range threshold may be represented by an absolute time range, such as the UTC, the system frame number. The time range threshold may also be represented by a starting time and the timer. The UE starts the timer at the starting time to indicate the starting of the starting time range threshold, and the timer timeout indicates the end of the starting time range threshold.

In an embodiment of the present disclosure, the position threshold includes a distance threshold between the UE and a first reference position.

Here, the first reference position may be predetermined, or may be negotiated, or may be specified by a communication protocol. The network may configure a distance threshold. When a distance between the UE and the first reference position is greater than or less than the distance threshold, the UE starts or stops the corresponding first prediction model. The first reference position may be configured by the network. The first reference position may include the center position of the serving cell, a center position of the neighbor cell, etc.

In an embodiment of the present disclosure, the signal quality threshold includes at least one of:

a signal quality threshold in a first time domain range;

a signal quality change threshold in the first time domain range;

a signal quality threshold of at least one cell; and a signal quality threshold of at least one type.

The signal quality threshold may include a threshold for a signal quality value or a threshold for a signal quality change value. For example, the signal quality threshold may at least include a signal strength threshold and a signal strength change threshold. The signal quality threshold may also be a signal quality threshold corresponding to a statistical value such as the maximum value, the minimum value, and an average value of the signal quality.

For example, the network may configure the signal strength threshold. When a signal strength of a primary serving cell (PCell) or a primary secondary serving cell (PsCell) measured by the UE is greater than the signal strength threshold, the UE starts the first prediction model, and when the signal strength measured by the UE is less than the signal strength threshold, the UE stops the first prediction model. Alternatively, when the signal strength of the PCell or the PsCell measured by the UE is less than the signal strength threshold, the UE starts the first prediction model, and when the signal strength measured by the UE is greater than the signal strength threshold, the UE stops the first prediction model.

For example, the network may configure the signal strength change threshold. In the first time domain range, when a change in a signal strength of the PCell or the PsCell measured by the UE is greater than the signal strength change threshold, the UE starts the corresponding first prediction model, and when the change in the signal strength of the PCell or the PsCell measured by the UE is less than the signal strength change threshold, the UE stops the corresponding first prediction model.

The first time domain range may be predetermined, configured by the network, specified by the protocol, or determined by the UE.

For example, the network may configure one or more cell signal strength thresholds. When the maximum value, the minimum value, or an average value of one or more predetermined cell signal strengths measured by the UE is greater than the signal strength threshold, the UE starts the corresponding first prediction model. Alternatively, when the maximum value, the minimum value, or the average value of the one or more predetermined cell signal strengths measured by the UE is less than the signal strength threshold, the UE stops the corresponding first prediction model.

For example, the network may configure the signal strength change threshold. Within a certain period of time, when the maximum value, the minimum value, or an average value of one or more predetermined cell signal strength changes measured by the UE is greater than the signal strength change threshold, the UE starts the corresponding first prediction model. Alternatively, within a certain period of time, when the maximum value, the minimum value or the average value of the one or more predetermined cell signal strength changes measured by the UE is less than the signal strength change threshold, the UE stops the corresponding first prediction model.

The predetermined cell may be configured by the network, may be specified by the protocol, or may be determined by the UE through historical information. The predetermined cell may be the PCell, a Secondary Cell (SCell), or the PsCell.

In an embodiment of the present disclosure, the prediction value of the second prediction model is determined by running the second prediction model by the UE based on a prediction value type in a first prediction type set.

The first prediction type set may be a set indicating a type of the prediction value of the second prediction model. The access network device may send the first prediction type set to the UE, and the UE uses the second prediction model to predict the corresponding prediction value type based on the prediction value type indicated by the access network device in the first prediction type set.

The prediction value type may indicate a prediction value that needs to be predicted. The prediction value may include; one or more signal quality values, etc. For example, the prediction result type may include; the RSRP, the RSRQ, the SINR, etc.

In an embodiment of the present disclosure, the first prediction type set includes at least one prediction value type of at least one prediction object.

As shown in Table 1, the first prediction type set may be configured with only one prediction value type to determine whether the prediction threshold requirement is met. This one prediction value type may correspond to a plurality of prediction objects.

TABLE 1

| Prediction value type corresponding to judgment threshold | Prediction object |
|---|---|
| prediction value type A | Cell1, Cell2, Cell3, Cell4 |

The first prediction type set may be configured with a plurality of prediction value types to determine whether requirements of different prediction thresholds are met.

The prediction object may also be the UE itself. The first prediction type set may include a prediction value type related to the UE's own characteristic.

For example, the network may configure a prediction threshold for a prediction value corresponding to the first prediction type set. When the prediction value corresponding to the first prediction type set obtained by the UE is greater than the prediction threshold, the UE starts the corresponding first prediction model, and when the prediction value corresponding to the first prediction type set obtained by the UE is less than the prediction threshold, the UE stops the corresponding first prediction model. Alternatively, when the prediction value corresponding to the first prediction type set obtained by the UE is less than the prediction threshold, the UE starts the corresponding first prediction model; and when the prediction value corresponding to the first prediction type set obtained by the UE is greater than the prediction threshold, the UE stops the corresponding first prediction model.

For example, the prediction threshold may be a threshold for a change in the prediction value. The network may configure the threshold for the change in the prediction value corresponding to the first prediction type set. Within a certain period of time, when a change in the prediction value corresponding to the first prediction type set obtained by the UE is greater than the prediction threshold, the UE starts the corresponding first prediction model; and when the change in the prediction value corresponding to the first prediction type set obtained by the UE is less than the prediction threshold, the UE stops the corresponding first prediction model. Alternatively, when the change in the prediction value corresponding to the first prediction type set obtained by the UE is less than the prediction threshold, the UE starts the corresponding first prediction model; and when the change in the prediction value corresponding to the first prediction type set obtained by the UE is greater than the prediction threshold, the UE stops the corresponding first prediction model.

In an embodiment of the present disclosure, the method further includes one of:

controlling the first prediction model to start in response to the second prediction model not being started; and controlling the first prediction model to stop in response to the second prediction model not being started.

If the required second prediction model in the first prediction type set that needs to be judged is not started, it may be considered that the threshold is not met, and the access network device may be notified that the corresponding second prediction model is not started, and the configured prediction threshold cannot be used for judgment.

When the prediction threshold cannot be used for judgment, the UE may control the first prediction model to start or control the first prediction model to stop based on a predetermined agreement.

For example, if the judgment of starting or stopping the first prediction model cannot be made based on the prediction value of the second prediction model, the UE may control the starting or stopping of the first prediction model based on its own resource occupancy and/or power conditions. For example, when the resources are occupied more and/or the remaining power is more, the first prediction model may be controlled to start; and when the resources are less occupied and/or the remaining power is less, the first prediction model may be controlled to stop.

In an embodiment of the present disclosure, the prediction threshold is used for the UE to compare with the prediction value of the second prediction model, and control, based on a comparison result, starting and/or stopping of cell measurement for a first cell.

Here, the prediction threshold may also be used to determine the starting and/or the stopping of the cell measurement. The starting and/or the stopping of the cell measurement for the first cell may be determined based on the comparison result between the prediction threshold and the prediction value of the second prediction model.

Here, the cell measurement may include cell radio link measurement.

The first cell may be predetermined, configured by the network, specified by the protocol, or determined by the UE. The first cell may include the serving cell, a non-serving cell, a cell with a given frequency point, a cell with a given cell ID, etc.

The starting of the cell measurement for different cells may correspond to different prediction threshold conditions. The starting of the cell measurement for the different cells may be configured at the same time. When the comparison result between the prediction threshold and the prediction value of the second prediction model meets the corresponding condition, the corresponding cell measurement is started.

For example, according to the second prediction model and the corresponding prediction threshold that are configured by the network, the UE may obtain the prediction value corresponding to the first prediction type set through the second prediction model, compare the prediction value with the prediction threshold, determine whether the predetermined condition is met, and if so, trigger the starting of the cell measurement.

For example, the prediction value of the second prediction model may be the signal quality of the serving cell, such as the RSRP. The prediction threshold is a threshold for the signal quality of the serving cell. The cell measurement for the non-serving cell needs to be started based on this prediction result. If the RSRP of the serving cell predicted by the second prediction model is less than the prediction threshold (e.g., 1 dBm), the cell measurement for the non-serving cell is started.

The stopping of the cell measurement for the different cells may also correspond to different prediction threshold conditions. The prediction threshold conditions for stopping the cell measurement of the different cells may be configured at the same time. When the comparison result between the prediction threshold and the prediction value of the second prediction model does not meet the corresponding condition, the corresponding cell measurement is stopped. Here, stopping the cell measurement may include; stopping currently ongoing cell measurement, and/or stopping cell measurement within a predetermined time period.

For example, according to the second prediction model and the corresponding prediction threshold that are configured by the network, the UE may obtain the prediction value corresponding to the first prediction type set through the second prediction model, compare the prediction value with the prediction threshold, determine whether the predetermined condition is met, and if not, stop the cell measurement.

For example, the prediction value of the second prediction model may be the signal quality of the serving cell, such as the RSRP. The prediction threshold is the threshold for the signal quality of the serving cell. The cell measurement for the non-serving cell needs to be stopped based on this prediction result. If the RSRP of the serving cell predicted by the second prediction model is greater than the prediction threshold (e.g., 1 dBm), the cell measurement for the non-serving cell is stopped.

In an embodiment of the present disclosure, in response to the UE receiving a stop measurement indication that the cell measurement for the first cell needs to be stopped, and the UE determining that none of the cell measurements for the first cell has been started, the UE may ignore the stop measurement indication. In an embodiment of the present disclosure, the prediction result is determined, by the first prediction model run by the UE, based on a prediction result type in a second prediction type set.

The second prediction type set may be a set indicating a prediction result type of the first prediction model. The access network device may send the second prediction type set to the UE, and the UE predicts the corresponding prediction result based on the prediction result type indicated by the access network device in the second prediction type set.

The prediction result type may indicate a prediction result that needs to be predicted. The prediction result type may include one or more signal quality types, etc. For example, the prediction result type may include; the RSRP, the RSRQ, the SINR, etc.

In an embodiment of the present disclosure, in response to the UE receiving the stop prediction indication to stop the first prediction model based on the second prediction type set, and the UE determining that none of the prediction for the second prediction type set has been started, the UE may ignore this stop prediction indication.

In an embodiment of the present disclosure, the second prediction type set includes at least one prediction result type of at least one prediction object.

Here, the prediction object may include; the frequency point, the beam, one or more of the serving cell, the neighbor cell, and cells designated by other networks, etc.

For example, the second prediction type set may include one or more prediction result types of all predictable cells, or one or more serving cells, or one or more neighbor cells. The UE may run the first prediction model to predict the prediction result corresponding to the one or more prediction result types.

The second prediction type set may be as shown in Table 2. The second prediction type set includes a plurality of prediction result types for three prediction objects.

TABLE 2

| Prediction object | Corresponding prediction result type |
|---|---|
| Cell 1 (serving cell) | prediction result type A, prediction result type B |
| Cell 2 | prediction result type C, prediction result type B |
| Cell 3 | prediction result type A, prediction result type C, prediction result type D |

The prediction object may also be the UE itself. The second prediction type set may include a prediction result types related to the UE's own characteristic.

For example, the second prediction type set includes one or more prediction result types related to the UE's own characteristic, such as prediction result type G and prediction result type H. The UE needs to respectively use the first prediction model to obtain prediction results corresponding to prediction result type G and prediction result type H for the UE characteristic.

In an embodiment of the present disclosure, the method further includes:

receiving a control instruction carrying indication information indicating the second prediction type set, and the control instruction indicates the UE to control starting or stopping of the first prediction model.

The second prediction type set may be carried by the control instruction. The control instruction may directly control the UE to start the first prediction model to predict the prediction result, or directly control the UE to stop the prediction of the prediction result by the first prediction model.

The second prediction type set carried by the control instruction may indicate the UE to control the first prediction model to start or stop the prediction of the prediction result type.

In an embodiment of the present disclosure, the control instruction indicating the starting of the first prediction model carries the second prediction type set that needs to be predicted; and/or, the control instruction indicating the stopping of the first prediction model carries the second prediction type set the prediction of which needs to be stopped.

The control instruction of the access network device indicating the UE to start the first prediction model may carry the second prediction type set that needs to be predicted by the first prediction model. After receiving the control instruction, the UE may determine the second prediction type set that needs to start the first prediction model for prediction.

The control instruction of the access network device indicating the UE to stop the first prediction model may carry the second prediction type set the prediction of which needs to be stopped by the first prediction model. After receiving the control instruction, the UE may determine the second prediction type set that needs to stop the prediction by the first prediction model In this way, by carrying the second prediction type set in the control instruction, one control instruction can be used to indicate the prediction result type the prediction of which by the first prediction mode needs to be started or stopped, thereby improving the indication efficiency of the control instruction.

In an embodiment of the present disclosure, the prediction result includes at least one of:

a prediction result associated with UE's own RRM;

a prediction result of RRM of a serving cell where the UE is located; and a prediction result of RRM of at least one neighbor cell of the UE.

The prediction result associated with the UE's own RRM may include but is not limited to:

a probability of occurrence of a high-traffic service for the UE within a certain period of time;

a probability of occurrence of a low-latency service for the UE within a certain period of time;

a motion trajectory and a movement direction of the UE within a certain period of time;

a Quality of Service (QOS) requirement of the UE within a certain period of time;

a Quality of Experience (QoE) requirement of the UE within a certain period of time, etc.

The prediction result of the RRM of the serving cell where the UE is located may include but is not limited to:

a probability of occurrence of a radio link failure for the UE within a certain period of time;

a probability of occurrence of interruption and call drop for the UE within a certain period of time;

a probability of occurrence of QoS/QoE failing to meet a UE's requirement within a certain period of time;

a probability that the UE can continue to reside on the serving cell within a certain period of time;

a possible average signal quality/peak signal quality/minimum signal quality of the serving cell where the UE continues to reside on within a certain period of time, here, the signal quality may include; RSRP/Reference Signal Receiving Quality (RSRQ)/Signal to Interference plus Noise Ratio (SINR);

a possible average rate/peak rate/minimum rate, etc., of the serving cell where the UE continues to reside on within a certain period of time;

a possible average transmission delay/minimum transmission delay/maximum transmission delay, etc. of the serving cell where the UE continues to reside on within a certain period of time.

The prediction result of the RRM of the at least one neighbor cell of the UE may include but is not limited to:

a probability of occurrence of handover failure when the UE accesses the neighbor cell;

a probability of occurrence of ping-pong when the UE selects to access the neighbor cell;

a probability of occurrence of interruption or call drop if the UE accesses the neighbor cell within a certain period of time;

a probability of occurrence of QoS/QoE failing to meet the UE's requirement if the UE accesses the neighbor cell within a certain period of time;

a probability that the UE can continue to reside on the neighbor cell if the UE accesses the neighbor cell within a certain period of time;

a possible average signal quality/peak signal quality/minimum signal quality if the UE accesses the neighbor cell within a certain period of time, here, the signal quality may include; RSRP/RSRQ/SINR;

a possible average rate/peak rate/minimum rate if the UE accesses the neighbor cell within a certain period of time;

a possible average transmission delay/minimum transmission delay/maximum transmission delay if the UE accesses the neighbor cell within a certain period of time.

In an embodiment of the present disclosure, the method further includes:

controlling the first prediction model to stop prediction for a predetermined prediction result type of a second cell, in response to the UE handing over from a serving cell to a target cell.

Here, the second cell may be predetermined, configured by the network, specified by the protocol, or determined by the UE. The second cell includes: the serving cell, the target cell and/or other designated cells. The specific prediction object, the prediction of which is stopped, may be determined through the network configuration, the UE implementation, or the protocol regulation.

When the UE receives a handover command sent by the network, if the UE needs to access the target cell, the UE may stop prediction functions of all or part of the prediction models on the serving cell or the target cell or other designated cells.

For example, after the UE hands over from the serving cell to the target cell, the prediction of the original serving cell may be stopped, thereby reducing the prediction load and the power consumption.

Figure 3:
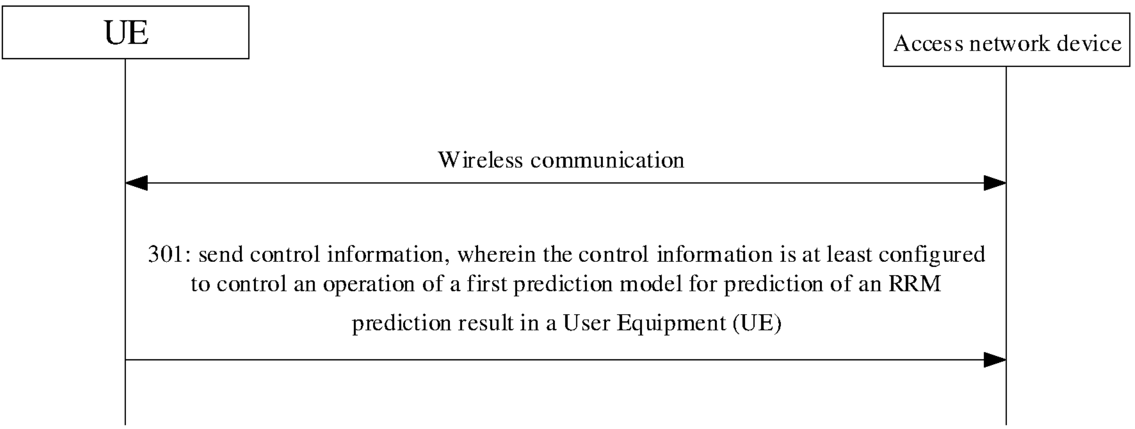
FIG. 3 illustrates a schematic flowchart of another method for transmitting information according to an embodiment of the present disclosure.

As shown in FIG. 3, an embodiment of the present disclosure provides a method for transmitting information. The method for transmitting the information may be applied to an access network device in a cellular mobile communication system, and include step 301.

In the step 301, control information is sent, and the control information is at least configured to control an operation of a first prediction model in a UE, and the first prediction model is configured to obtain a prediction result of RRM.

Here, the UE may be a mobile phone UE that adopts cellular mobile communication technologies for wireless communication, etc. An access network device may be a base station that provides an access network interface to the UE in the cellular mobile communication system, etc.

The first prediction model may be a machine learning model with learning capabilities, including but not limited to a neural network, etc. The first prediction model may predict RRM-associated information based on historical data and information associated with the RRM (e.g., a position of the UE, mobility information of the UE, historical access information of the UE in one or more cells, etc.), in order to obtain a prediction result.

For example, the first prediction model may be a 3 Convolutional Neural Networks (CNN) model. The 3CNN model may be adopted to predict a Reference Signal Receiving Power (RSRP), etc., in order to obtain the predicted RSRP value, etc. Here, the historical data may be historical data used to determine the RRM prediction result, such as a correspondence between a historical RSRP and the UE position, a correspondence between the historical RSRP and a UE speed, etc.

The first prediction model may be run by the UE. Compared with a first prediction model on a network side, the first prediction model run by the UE eliminates the need for the network side to store the data and calculate the first prediction model for each UE. The data and the first prediction model may be maintained locally by the UE. The UE may train a customized AI module for the UE through the local data, thereby providing a better user experience. In addition, the UE may complete the training and prediction of the first prediction model locally without uploading the data with a security requirement, thereby improving the data security. The UE does not need to upload training data, etc. through a radio link, reducing wireless communication load.

The prediction result may be one or more results for different prediction objects. For example, the prediction result may be a plurality of RRM prediction results for different cells, etc.

Here, the access network device may send control information to the UE to control the operation of the first prediction model in the UE. The control information may control the UE to start the first prediction model to predict the prediction result, or control the UE to stop the prediction of the prediction result by the first prediction model. The control information may also be used to provide a judgment threshold for the UE to judge whether to start the first prediction model to predict the prediction result, and/or to stop the prediction of the prediction result by the first prediction model. For example, the control information may indicate a time when the UE starts or stops the operation of the first prediction model, etc.

The control information may also be used to configure the first prediction model, for example, configure a type of a prediction result determined by the first prediction model, etc.

In this way, the access network device controls the operation of the first prediction model in the UE through the control information, thereby realizing the control of the starting and/or the stopping the first prediction model in the UE. The access network device can obtain the prediction result in time according to its own needs; and the additional power loss caused by the continuous or unnecessary operation of the first prediction model is reduced.

In an embodiment of the present disclosure, the control information includes:

- a control instruction, and upon being received by the UE, the control instruction is configured to control starting or stopping of the first prediction model; and/or
- configuration information, including threshold information for controlling the starting and/or the stopping of the first prediction model.

The control instruction may be an instruction that directly controls the UE to start the first prediction model to predict the prediction result, or directly controls the UE to stop the prediction of the prediction result by the first prediction model.

The control instructions may be carried in a RRC signaling, a MAC signaling and/or a DCI signaling. For example, in order to improve the timeliness of the control instruction, the control instructions may be carried in the DCI signaling.

In this way, the access network device may start or stop the operation of the first prediction model in the UE according to its own needs, obtain the prediction result in time when there is a demand, and stop the operation of the first prediction model in time when there is no demand, thereby reducing the resource waste and the power loss caused by the uncontrolled operation of the first prediction model.

The control information may also be used to provide judgement threshold information for the UE to judge and determine to start the first prediction model to predict the prediction result and/or stop the first prediction model to predict the prediction result. The threshold information may be carried in the RRC signaling, the MAC signaling and/or the DCI signaling.

The threshold information may indicate a judgment condition for the UE to start the first prediction model and/or stop the first prediction model. For example, the threshold information may be timing information of a timer. When the timer overflows, the UE starts the first prediction model and/or stops the first prediction model. The threshold information may be state information of the UE, and the threshold information may indicate that; when the UE is in a first state, the UE starts the first prediction model; when the UE is in a second state that is different from the first state, the UE stops the first prediction model. For example, the first state may be a high power state, and the second state may be a low power state.

In this way, through the control information provided by the access network device, the UE can autonomously judge to start or stop the operation of the first prediction model in the UE, which improves the acquisition of the prediction result and improves the autonomy of the UE in controlling the operation of the first prediction model. When there is a demand, the prediction result is timely acquired, and when there is no demand, the operation of the first prediction model is timely stopped, reducing a case of the uncontrolled operation of the first prediction model, and in turn reducing the power loss caused by the uncontrolled operation of the first prediction model.

In an embodiment of the present disclosure, the threshold information indicates at least one of:

- a time threshold, including a time threshold for the starting of the first prediction model and/or a time threshold for the stopping of the first prediction model;

a position threshold, including a position threshold for the starting of the first prediction model and/or a position threshold for the stopping of the first prediction model;

a movement speed threshold, including a movement speed threshold for the starting of the first prediction model and/or a movement speed threshold for the stopping of the first prediction model;

a signal quality threshold, including a signal quality threshold for the starting of the first prediction model and/or a signal quality threshold for the stopping of the first prediction model; and a prediction threshold, including a prediction threshold for the starting of the first prediction model and/or a prediction threshold for the stopping of the first prediction model, and the prediction threshold is configured to be compared with a prediction value of a second prediction model.

The time threshold may be used for the UE to compare with a corresponding time parameter, and determine the starting or the stopping of the first prediction model based on a comparison result. The time threshold may include a threshold for determining the starting of the first prediction model and/or a threshold for determining the stopping of the first prediction model. The time parameter may be a time point and/or a duration value or a time range. The time threshold may be a threshold for the time parameter or a threshold for a time parameter change value.

For example, the time threshold may be the time range. The time threshold may indicate the time range through a starting time value and a stopping time value, and the time threshold may also indicate the time range through the starting time value and a running duration.

The position threshold may be used for the UE to compare with the corresponding position parameter, and determine the starting or the stopping of the first prediction model based on a comparison result. The position threshold may include a threshold for determining the staring of the first prediction model and/or a threshold for determining the stopping of the first prediction model. The position parameter may be a relative distance, angle, etc. from a reference point. The position threshold may be a threshold for a specific position parameter or a threshold for a position parameter change value.

For example, the position threshold may be a distance threshold for a distance between the UE and a center position of a serving cell. When the distance between the UE and the center position of the serving cell is less than the distance threshold, the operation of the first prediction model to predict a signal quality of a neighbor cell may be stopped. When the distance between the UE and the center position of the serving cell is greater than the distance threshold, the operation of the first prediction model may be started to predict the signal quality of the neighbor cell to prepare for cell handover.

The movement speed threshold may be used for the UE to compare with the corresponding movement speed parameter, and determine the starting or the stopping of the first prediction model based on a comparison result. The movement speed threshold may include a threshold for determining the staring of the first prediction model and/or a threshold for determining the stopping of the first prediction model. The movement speed threshold may be a threshold for a specific movement speed parameter, or a threshold for a movement speed parameter change value.

For example, when a movement speed of the UE is high, that is, the movement speed is greater than a speed threshold, the first prediction model may be used in advance, due to the frequent cell handover, to predict the signal quality of the neighbor cell, and then a target cell to which needs to be handed over may be predicted in advance, preparing for handover and improving a cell handover efficiency.

The signal quality threshold may be used for the UE to compare with the corresponding signal quality value, and determine the starting or the stopping of the first prediction model based on a comparison result. The signal quality threshold may include a threshold for determining the starting of the first prediction model and/or a threshold for determining the stopping of the first prediction model.

The signal quality value reflects a signal quality (e.g., RSRP or RSPQ, etc.) of a prediction object such as a cell, a frequency point, a beam, etc. The signal quality threshold may be a threshold for a specific signal quality value or a threshold for a signal quality change value.

The network may determine the threshold information based on a precision difference, an energy consumption difference, a resource consumption difference, etc. generated by an actual measurement and the prediction model. For example, the network may start the prediction model in a case that the precision difference between an expected prediction result of the prediction model and the actual measurement is within an acceptable range, and the prediction model has lower resource consumption. Alternatively, the network may stop the prediction model in a case that the precision difference between the expected prediction result of the prediction model and the actual measurement is within an unacceptable range, and the prediction model has higher resource consumption.

In an embodiment of the present disclosure, the signal quality threshold includes a difference threshold between a signal quality value predicted by the first prediction model and an actually measured signal quality value.

The signal quality threshold may be a difference threshold between a signal quality value, within a predetermined time period, predicted by the first prediction model and the actually measured signal quality value.

For example, when an error between a prediction result of a running first prediction model and an actual measurement result is greater than a certain threshold, the first prediction model is stopped.

For example, the first prediction model predicts that an average RSRP of the UE in the subsequent 10 s is a, and after 10 s, the UE determines that an average RSRP obtained through the actual measured RSRP within the 10 s is b, and the error is an absolute value c of a−b. When c is greater than the signal quality threshold, the first prediction model is stopped.

The prediction threshold may be used for the UE to compare with the prediction value of the second prediction model, and determine the starting or the stopping of the first prediction model based on a comparison result. The prediction threshold may include a threshold for determining the starting of the first prediction model and/or a threshold for determining the stopping of the first prediction model.

Here, the first prediction model and the second prediction model may be the same or different. The UE may determine the starting and/or stopping of the first prediction model based on a comparison result of the prediction threshold and the prediction value of the second prediction model. The second prediction model may determine the prediction value before the UE determines the starting and/or stopping of the second prediction model.

The first prediction model may have higher resource consumption and/or power consumption than the second prediction model. In this way, determining whether to activate the first prediction model through the prediction value of the second prediction model may reduce the resource consumption and/or the power consumption caused by directly activating the first prediction model.

For example, the first prediction model may measure the signal quality of the neighbor cell, such as the RSRP. The prediction value of the second prediction model may be the signal quality of the serving cell, such as the RSRP. The prediction threshold is the signal quality threshold of the serving cell. If the RSRP of the serving cell predicted by the second prediction model is less than the prediction threshold (e.g., 1 dBm), the first prediction model is started to predict the RSRP of the neighbor cell. The neighbor cell may include all neighbor cells that the UE can predict, for example, neighbor cells that can be measured or neighbor cells that have stored corresponding historical information.

In an embodiment of the present disclosure, the time threshold, the position threshold, the movement speed threshold, the signal quality threshold and/or the prediction threshold may be used for the UE, through the combinational logic relationship, to determine the starting and/or the stopping of the prediction model.

For example, the time threshold and the position threshold may adopt the logic AND relationship for the UE to determine the starting and/or the stopping of the prediction model. That is, both the time threshold and the position threshold need to be met before the UE can start or stop the prediction model. The logic relationship includes at least; logic AND, and/or logic OR, etc.

In an embodiment of the present disclosure, the time threshold includes at least one of:

a time point threshold; and a time range threshold.

In an embodiment of the present disclosure, the network may configure a starting time point threshold. When a current time reaches the starting time point threshold, the UE starts the first prediction model. The network may also configure a stopping time point threshold. When the current time reaches the stopping time point threshold, the UE stops the first prediction model.

The time point threshold may be represented by the absolute time, such as UTC, a system frame number, or may be represented by a timer. The UE starts the timer when it receives the starting time point threshold, and starts the first prediction model after timeout. Alternatively, the UE starts the timer when it receives the stopping time point threshold, and stops the first prediction model after timeout.

The time range threshold may be a starting time range threshold and/or a stopping time range threshold. In an embodiment of the present disclosure, the network may configure the starting time range threshold, the corresponding first prediction model is started within the starting time range threshold, and the first prediction model is stopped after the starting time range threshold ends. The time range threshold may be represented by an absolute time range, such as the UTC, the system frame number. The time range threshold may also be represented by a starting time and the timer. The UE starts the timer at the starting time to indicate the starting of the starting time range threshold, and the timer timeout indicates the end of the starting time range threshold.

In an embodiment of the present disclosure, the position threshold includes a distance threshold between the UE and a first reference position.

Here, the first reference position may be predetermined, or may be negotiated, or may be specified by a communication protocol. The network may configure a distance threshold. When a distance between the UE and the first reference position is greater than or less than the distance threshold, the UE starts or stops the corresponding first prediction model. The first reference position may be configured by the network. The first reference position may include the center position of the serving cell, a center position of the neighbor cell, etc.

In an embodiment of the present disclosure, the signal quality threshold includes at least one of:

a signal quality threshold in a first time domain range;

a signal quality change threshold in the first time domain range;

a signal quality threshold of at least one cell; and a signal quality threshold of at least one type.

The signal quality threshold may include a threshold for a signal quality value or a threshold for a signal quality change value. For example, the signal quality threshold may at least include a signal strength threshold and a signal strength change threshold. The signal quality threshold may also be a signal quality threshold corresponding to a statistical value such as the maximum value, the minimum value, and an average value of the signal quality.

For example, the network may configure the signal strength threshold. When a signal strength of a primary serving cell (PCell) or a primary secondary serving cell (PsCell) measured by the UE is greater than the signal strength threshold, the UE starts the first prediction model, and when the signal strength measured by the UE is less than the signal strength threshold, the UE stops the first prediction model. Alternatively, when the signal strength of the PCell or the PsCell measured by the UE is less than the signal strength threshold, the UE starts the first prediction model, and when the signal strength measured by the UE is greater than the signal strength threshold, the UE stops the first prediction model.

For example, the network may configure the signal strength change threshold. In the first time domain range, when a change in a signal strength of the PCell or the PsCell measured by the UE is greater than the signal strength change threshold, the UE starts the corresponding first prediction model, and when the change in the signal strength of the PCell or the PsCell measured by the UE is less than the signal strength change threshold, the UE stops the corresponding first prediction model.

The first time domain range may be predetermined, configured by the network, specified by the protocol, or determined by the UE.

For example, the network may configure one or more cell signal strength thresholds. When the maximum value, the minimum value, or an average value of one or more predetermined cell signal strengths measured by the UE is greater than the signal strength threshold, the UE starts the corresponding first prediction model. Alternatively, when the maximum value, the minimum value, or the average value of the one or more predetermined cell signal strengths measured by the UE is less than the signal strength threshold, the UE stops the corresponding first prediction model.

For example, the network may configure the signal strength change threshold. Within a certain period of time, when the maximum value, the minimum value, or an average value of one or more predetermined cell signal strength changes measured by the UE is greater than the signal strength change threshold, the UE starts the corresponding first prediction model. Alternatively, within a certain period of time, when the maximum value, the minimum value or the average value of the one or more predetermined cell signal strength changes measured by the UE is less than the signal strength change threshold, the UE stops the corresponding first prediction model.

The predetermined cell may be configured by the network, may be specified by the protocol, or may be determined by the UE through historical information. The predetermined cell may be the PCell, a Secondary Cell (SCell), or the PsCell.

In an embodiment of the present disclosure, the prediction value of the second prediction model is determined by running the second prediction model by the UE based on a prediction value type in a first prediction type set.

The first prediction type set may be a set indicating a type of the prediction value of the second prediction model. The access network device may send the first prediction type set to the UE, and the UE uses the second prediction model to predict the corresponding prediction value type based on the prediction value type indicated by the access network device in the first prediction type set.

The prediction value type may indicate a prediction value that needs to be predicted. The prediction value may include; one or more signal quality values, etc. For example, the prediction result type may include; the RSRP, the RSRQ, the SINR, etc.

In an embodiment of the present disclosure, the first prediction type set includes at least one prediction value type of at least one prediction object.

As shown in Table 1, the first prediction type set may be configured with only one prediction value type to determine whether the prediction threshold requirement is met. This one prediction value type may correspond to a plurality of prediction objects.

The first prediction type set may be configured with a plurality of prediction value types to determine whether requirements of different prediction thresholds are met.

The prediction object may also be the UE itself. The first prediction type set may include a prediction value type related to the UE's own characteristic.

For example, the network may configure a prediction threshold for a prediction value corresponding to the first prediction type set. When the prediction value corresponding to the first prediction type set obtained by the UE is greater than the prediction threshold, the UE starts the corresponding first prediction model, and when the prediction value corresponding to the first prediction type set obtained by the UE is less than the prediction threshold, the UE stops the corresponding first prediction model. Alternatively, when the prediction value corresponding to the first prediction type set obtained by the UE is less than the prediction threshold, the UE starts the corresponding first prediction model; and when the prediction value corresponding to the first prediction type set obtained by the UE is greater than the prediction threshold, the UE stops the corresponding first prediction model.

For example, the prediction threshold may be a threshold for a change in the prediction value. The network may configure the threshold for the change in the prediction value corresponding to the first prediction type set. Within a certain period of time, when a change in the prediction value corresponding to the first prediction type set obtained by the UE is greater than the prediction threshold, the UE starts the corresponding first prediction model; and when the change in the prediction value corresponding to the first prediction type set obtained by the UE is less than the prediction threshold, the UE stops the corresponding first prediction model. Alternatively, when the change in the prediction value corresponding to the first prediction type set obtained by the UE is less than the prediction threshold, the UE starts the corresponding first prediction model; and when the change in the prediction value corresponding to the first prediction type set obtained by the UE is greater than the prediction threshold, the UE stops the corresponding first prediction model.

In an embodiment of the present disclosure, the method further includes one of:

controlling, by the UE, the first prediction model to start in response to the second prediction model not being started; and controlling, by the UE, the first prediction model to stop in response to the second prediction model not being started.

If the required second prediction model in the first prediction type set that needs to be judged is not started, it may be considered that the threshold is not met, and the access network device may be notified that the corresponding second prediction model is not started, and the configured prediction threshold cannot be used for judgment.

When the prediction threshold cannot be used for judgment, the UE may control the first prediction model to start or control the first prediction model to stop based on a predetermined agreement.

For example, if the judgment of starting or stopping the first prediction model cannot be made based on the prediction value of the second prediction model, the UE may control the starting or stopping of the first prediction model based on its own resource occupancy and/or power conditions. For example, when the resources are occupied more and/or the remaining power is more, the first prediction model may be controlled to start; and when the resources are less occupied and/or the remaining power is less, the first prediction model may be controlled to stop.

In an embodiment of the present disclosure, the prediction threshold is used for the UE to compare with the prediction value of the second prediction model, and control, based on a comparison result, starting and/or stopping of cell measurement for a first cell.

Here, the prediction threshold may also be used to determine the starting and/or the stopping of the cell measurement. The starting and/or the stopping of the cell measurement for the first cell may be determined based on the comparison result between the prediction threshold and the prediction value of the second prediction model.

Here, the cell measurement may include cell radio link measurement.

The first cell may be predetermined, configured by the network, specified by the protocol, or determined by the UE. The first cell may include the serving cell, a non-serving cell, a cell with a given frequency point, a cell with a given cell ID, etc.

The starting of the cell measurement for different cells may correspond to different prediction threshold conditions. The starting of the cell measurement for the different cells may be configured at the same time. When the comparison result between the prediction threshold and the prediction value of the second prediction model meets the corresponding condition, the corresponding cell measurement is started.

For example, according to the second prediction model and the corresponding prediction threshold that are configured by the network, the UE may obtain the prediction value corresponding to the first prediction type set through the second prediction model, compare the prediction value with the prediction threshold, determine whether the predetermined condition is met, and if so, trigger the starting of the cell measurement.

For example, the prediction value of the second prediction model may be the signal quality of the serving cell, such as the RSRP. The prediction threshold is a threshold for the signal quality of the serving cell. The cell measurement for the non-serving cell needs to be started based on this prediction result. If the RSRP of the serving cell predicted by the second prediction model is less than the prediction threshold (e.g., 1 dBm), the cell measurement for the non-serving cell is started.

The stopping of the cell measurement for the different cells may also correspond to different prediction threshold conditions. The prediction threshold conditions for stopping the cell measurement of the different cells may be configured at the same time. When the comparison result between the prediction threshold and the prediction value of the second prediction model does not meet the corresponding condition, the corresponding cell measurement is stopped. Here, stopping the cell measurement may include; stopping currently ongoing cell measurement, and/or stopping cell measurement within a predetermined time period.

For example, according to the second prediction model and the corresponding prediction threshold that are configured by the network, the UE may obtain the prediction value corresponding to the first prediction type set through the second prediction model, compare the prediction value with the prediction threshold, determine whether the predetermined condition is met, and if not, stop the cell measurement.

For example, the prediction value of the second prediction model may be the signal quality of the serving cell, such as the RSRP. The prediction threshold is the threshold for the signal quality of the serving cell. The cell measurement for the non-serving cell needs to be stopped based on this prediction result. If the RSRP of the serving cell predicted by the second prediction model is greater than the prediction threshold (e.g., 1 dBm), the cell measurement for the non-serving cell is stopped.

In an embodiment of the present disclosure, in response to the UE receiving a stop measurement indication that the cell measurement for the first cell needs to be stopped, and the UE determining that none of the cell measurements for the first cell has been started, the UE may ignore the stop measurement indication. In an embodiment of the present disclosure, the prediction result is determined, by the first prediction model run by the UE, based on a prediction result type in a second prediction type set.

The second prediction type set may be a set indicating a prediction result type of the first prediction model. The access network device may send the second prediction type set to the UE, and the UE predicts the corresponding prediction result based on the prediction result type indicated by the access network device in the second prediction type set.

The prediction result type may indicate a prediction result that needs to be predicted. The prediction result type may include one or more signal quality types, etc. For example, the prediction result type may include; the RSRP, the RSRQ, the SINR, etc.

In an embodiment of the present disclosure, in response to the UE receiving the stop prediction indication to stop the first prediction model based on the second prediction type set, and the UE determining that none of the prediction for the second prediction type set has been started, the UE may ignore this stop prediction indication.

In an embodiment of the present disclosure, the second prediction type set includes at least one prediction result type of at least one prediction object.

Here, the prediction object may include; the frequency point, the beam, one or more of the serving cell, the neighbor cell, and cells designated by other networks, etc.

For example, the second prediction type set may include one or more prediction result types of all predictable cells, or one or more serving cells, or one or more neighbor cells. The UE may run the first prediction model to predict the prediction result corresponding to the one or more prediction result types.

The second prediction type set may be as shown in Table 2. The second prediction type set includes a plurality of prediction result types for three prediction objects.

The prediction object may also be the UE itself. The second prediction type set may include a prediction result types related to the UE's own characteristic.

For example, the second prediction type set includes one or more prediction result types related to the UE's own characteristic, such as prediction result type G and prediction result type H. The UE needs to respectively use the first prediction model to obtain prediction results corresponding to prediction result type G and prediction result type H for the UE characteristic.

In an embodiment of the present disclosure, the method further includes:

- sending a control instruction carrying indication information indicating the second prediction type set, and the control instruction indicates the UE to control starting or stopping of the first prediction model.

The second prediction type set may be carried by the control instruction. The control instruction may directly control the UE to start the first prediction model to predict the prediction result, or directly control the UE to stop the prediction of the prediction result by the first prediction model.

The second prediction type set carried by the control instruction may indicate the UE to control the first prediction model to start or stop the prediction of the prediction result type.

In an embodiment of the present disclosure, the control instruction indicating the starting of the first prediction model carries the second prediction type set that needs to be predicted; and/or,

- the control instruction indicating the stopping of the first prediction model carries the second prediction type set the prediction of which needs to be stopped.

The control instruction of the access network device indicating the UE to start the first prediction model may carry the second prediction type set that needs to be predicted by the first prediction model. After receiving the control instruction, the UE may determine the second prediction type set that needs to start the first prediction model for prediction.

The control instruction of the access network device indicating the UE to stop the first prediction model may carry the second prediction type set the prediction of which needs to be stopped by the first prediction model. After receiving the control instruction, the UE may determine the second prediction type set that needs to stop the prediction by the first prediction model In this way, by carrying the second prediction type set in the control instruction, one control instruction can be used to indicate the prediction result type the prediction of which by the first prediction mode needs to be started or stopped, thereby improving the indication efficiency of the control instruction.

In an embodiment of the present disclosure, the prediction result includes at least one of:

a prediction result associated with UE's own RRM;

a prediction result of RRM of a serving cell where the UE is located; and a prediction result of RRM of at least one neighbor cell of the UE.

The prediction result associated with the UE's own RRM may include but is not limited to:

a probability of occurrence of a high-traffic service for the UE within a certain period of time;

a probability of occurrence of a low-latency service for the UE within a certain period of time;

a motion trajectory and a movement direction of the UE within a certain period of time;

a Quality of Service (QOS) requirement of the UE within a certain period of time;

a Quality of Experience (QoE) requirement of the UE within a certain period of time, etc.

The prediction result of the RRM of the serving cell where the UE is located may include but is not limited to:

a probability of occurrence of a radio link failure for the UE within a certain period of time;

a probability of occurrence of interruption and call drop for the UE within a certain period of time;

a probability of occurrence of QoS/QoE failing to meet a UE's requirement within a certain period of time;

a probability that the UE can continue to reside on the serving cell within a certain period of time;

a possible average signal quality/peak signal quality/minimum signal quality of the serving cell where the UE continues to reside on within a certain period of time, here, the signal quality may include; RSRP/Reference Signal Receiving Quality (RSRQ)/Signal to Interference plus Noise Ratio (SINR);

a possible average rate/peak rate/minimum rate, etc., of the serving cell where the UE continues to reside on within a certain period of time;

a possible average transmission delay/minimum transmission delay/maximum transmission delay, etc. of the serving cell where the UE continues to reside on within a certain period of time.

The prediction result of the RRM of the at least one neighbor cell of the UE may include but is not limited to:

a probability of occurrence of handover failure when the UE accesses the neighbor cell;

a probability of occurrence of ping-pong when the UE selects to access the neighbor cell;

a probability of occurrence of interruption or call drop if the UE accesses the neighbor cell within a certain period of time;

a probability of occurrence of QoS/QoE failing to meet the UE's requirement if the UE accesses the neighbor cell within a certain period of time;

a probability that the UE can continue to reside on the neighbor cell if the UE accesses the neighbor cell within a certain period of time;

a possible average signal quality/peak signal quality/minimum signal quality if the UE accesses the neighbor cell within a certain period of time, here, the signal quality may include; RSRP/RSRQ/SINR;

a possible average rate/peak rate/minimum rate if the UE accesses the neighbor cell within a certain period of time;

a possible average transmission delay/minimum transmission delay/maximum transmission delay if the UE accesses the neighbor cell within a certain period of time.

In an embodiment of the present disclosure, the method further includes:

controlling, by the UE, the first prediction model to stop prediction for a predetermined prediction result type of a second cell, in response to the UE handing over from a serving cell to a target cell.

Here, the second cell may be predetermined, configured by the network, specified by the protocol, or determined by the UE. The second cell includes: the serving cell, the target cell and/or other designated cells. The specific prediction object, the prediction of which is stopped, may be determined through the network configuration, the UE implementation, or the protocol regulation.

When the UE receives a handover command sent by the network, if the UE needs to access the target cell, the UE may stop prediction functions of all or part of the prediction models on the serving cell or the target cell or other designated cells.

For example, after the UE hands over from the serving cell to the target cell, the prediction of the original serving cell may be stopped, thereby reducing the prediction load and the power consumption.

For example, embodiments of the present disclosure provide a method for controlling starting and stopping of a prediction model by a UE, including; 1. starting or stopping, by the UE, an AI prediction function of a prediction model according to network configuration information.

1.1. A network configures prediction starting threshold information, and the UE determines whether the prediction starting threshold configured by the network is met, and starts the corresponding prediction model if the prediction starting threshold is met.

1.2. The network configures prediction stopping threshold information, and the UE determines whether the prediction stopping threshold configured by the network is met, and stops the corresponding prediction model if the prediction stopping threshold is met.

1.3. The network indicates the UE to start the prediction through a control instruction, and the UE starts the corresponding prediction model after receiving the control instruction from the network.

1.4. The network indicates the UE to stop the prediction through the control instruction, and the UE stops the corresponding prediction model after receiving the control instruction from the network.

1.5. The AI prediction function refers to a wireless AI prediction function.

1.5.1. In an embodiment of the present disclosure, the UE may use the wireless AI prediction function of the prediction model to predict some mobility-related characteristics of a serving cell, a neighbor cell, and the UE itself. A prediction result obtained by using the wireless AI prediction function may be used for assisting the network for mobility management.

1.6. The AI prediction function refers to obtaining, through the AI, a prediction set configured by the network, that is, a prediction result corresponding to a second prediction type set.

2. The prediction starting/stopping threshold information configured by the network in 1.1 and 1.2 may include one or more of the following information;

2.1. Time-related time threshold.

2.1.1. In an embodiment of the present disclosure, the network may configure a starting or stopping time point. When the starting or stopping time point is reached, the corresponding AI prediction function is started or stopped. The time point may be represented by an absolute time, such as the UTC, the system frame number; and the time point may also be represented by a timer, the UE starts the timer when receiving a starting or stopping time threshold, and starts or stops the corresponding AI prediction function after timeout.

2.1.2. In an embodiment of the present disclosure, the network may configure a starting time range threshold. A corresponding AI prediction process is started within the starting time range threshold, and the corresponding AI prediction process is stopped after the starting time range threshold ends. The time range may be represented by an absolute time range, such as the UTC, the system frame number. The time range may also be represented by a starting time and the timer, the UE starts the timer at the starting time to indicate a start of the starting time range, and the timer timeout indicates an end of the starting time range.

2.2. Position-related position threshold.

2.2.1. In an embodiment of the present disclosure, the position threshold may be a distance threshold. The network may configure the distance threshold. When a distance between the UE and a reference point, that is, a first reference position, is greater than or less than the distance threshold, the UE starts or stops the corresponding AI prediction function. The reference point may be a center of the neighbor cell, a center of the serving cell configured by the network, etc.

2.3. Movement speed-related speed threshold 2.3.1. In an embodiment of the present disclosure, the network may configure the speed threshold. When a movement speed of the UE is greater than or less than the speed threshold, the UE starts or stops the corresponding AI prediction function.

2.4. Signal strength-related signal quality threshold, including but not limited to; one or more signal strength thresholds among RSRP, RSRQ, and SINR.

2.4.1. In an embodiment of the present disclosure, the network may configure a signal strength threshold. When a signal strength of a primary serving cell (PCell or PsCell) measured by the UE is greater than or less than the signal strength threshold, the UE starts or stops the corresponding AI prediction function.

2.4.2. In an embodiment of the present disclosure, the network may configure a signal strength change threshold. Within a certain period of time, when a signal strength change of the primary serving cell (PCell or PsCell) measured by the UE is greater than or less than the signal strength change threshold, the UE starts or stops the corresponding AI prediction function. The certain period of time may be configured by the network, specified by a protocol, or determined by the UE.

2.4.3. In an embodiment of the present disclosure, the network may configure the signal strength threshold. When the maximum value, the minimum value or an average value of one or more predetermined cell signal strengths measured by the UE is greater than or less than the signal strength threshold, the UE starts or stops the corresponding AI prediction function. The predetermined cell may be configured by the network, or may be specified by the protocol (such as a combination of PCell, SCell, PsCell, etc.), or may be determined by the UE through historical information.

2.4.4. In an embodiment of the present disclosure, the network may configure the signal strength change threshold. Within a certain period of time, when the maximum value/the minimum value/an average value of the one or more predetermined cell signal strength changes measured by the UE is greater than or less than the signal strength change threshold, the UE starts or stops the corresponding AI prediction function. The certain period of time may be configured by the network, specified by the protocol, or may be determined by the UE. The predetermined cell may be configured by the network, may be specified by a protocol (such as a combination of PCell, SCell, PsCell, etc.), or may be determined by the UE through historical information.

2.5. Trigger prediction set, that is, a prediction threshold related to a first prediction type set.

2.5.1. In an embodiment of the present disclosure, the network may configure a prediction threshold for a prediction value of the trigger prediction set. When the maximum value/the minimum value/an average value of the prediction value corresponding to the trigger prediction set obtained by the UE is greater than or less than a prediction threshold for a prediction result, the UE starts/stops the corresponding AI prediction function.

2.5.2. In an embodiment of the present disclosure, the network may configure a prediction value change threshold for the trigger prediction set. Within a certain period of time, when the maximum value/the minimum value/an average value of changes in prediction values corresponding to the trigger prediction set obtained by the UE within is greater than or less than the prediction value change threshold, the UE starts or stops the corresponding AI prediction function. The certain period of time may be configured by the network, or may be specified by the protocol, or may be determined by the UE.

3. The prediction set in 1.6 may include a set of one or more prediction result types corresponding to one or more prediction objects.

3.1. The prediction object may be one or more of a serving cell, a neighbor cell, and cells designated by other networks.

3.1.1. In an embodiment of the present disclosure, the prediction set in 1.6 includes one or more prediction result types of all predictable cells/one or more serving cells/one or more neighbor cells. That is, if an AI prediction function corresponding to this prediction set is activated, the UE needs to respectively use the AI to obtain prediction results of prediction result types included in the prediction set corresponding to all predictable cells/the one or more serving cells/the one or more neighbor cells.

3.1.2. In an embodiment of the present disclosure, the prediction set in 1.6 includes one or more prediction result types of one or more cells specified by the network. That is, as shown in Table 2, if the AI prediction function corresponding to this prediction set is activated, the UE needs to respectively use the AI to obtain prediction results of prediction result types corresponding to the cells specified by the network.

3.2. The prediction object may be the UE, and the corresponding prediction result type is a prediction result related to the UE's own characteristic.

3.2.1. In an embodiment of the present disclosure, the prediction set in 1.5 includes one or more prediction result types related to the UE's own characteristic, such as prediction result type G and prediction result type H. That is, if the AI prediction function corresponding to this prediction set is activated, the UE needs to respectively use the AI to obtain prediction results of the prediction result type G and prediction result type H for the UE characteristic.

3.3. The prediction result type in 3 includes but is not limited to one or more of the prediction result types in 11.

4. The trigger prediction set in 2.5 is a set of prediction value types for triggering the starting/stopping of the AI prediction function.

4.1. As shown in Table 1, only one prediction value type may be configured in the trigger prediction set to determine whether a threshold requirement is met.

5. The plurality of starting or stopping thresholds in 2 may also be used in combination.

In an embodiment of the present disclosure, the network may configure the plurality of starting or stopping thresholds, which are combined in a logic relationship of AND or OR.

6. The control instruction for the network to indicate the UE to start the prediction model in 1.3 may include a prediction set corresponding to the AI prediction function that needs to be started.

7. The control instruction for the network to indicate the UE to stop the prediction model in 1.4 may include a prediction set corresponding to the AI prediction function that needs to be stopped.

8. When the UE receives a handover command sent by the network, the UE may stop AI prediction functions of all or part of prediction models on the serving cell or the target cell or other designated cells if the UE needs to access the target cell. A specific prediction object, the prediction of which is stopped, may be determined through the network configuration, the UE implementation, or the protocol regulation.

9. For a prediction value threshold related to the trigger prediction set in 2.5, if an AI prediction function required for the prediction set that needs to be determined is not started, it may be considered that the prediction value threshold is not met, and the network may be notified that the corresponding AI prediction function is not started, and the configured prediction value threshold cannot be used for judgment.

10. The prediction value threshold related to the trigger prediction set in 2.5 may also be used to start cell measurement;

10.1. the measurement includes radio link measurement.

10.2. starting the cell measurement may be;

10.2.1. starting measurement of a serving cell.

10.2.2. starting measurement of a non-serving cell.

10.2.3. starting measurement of a cell with a given frequency point.

10.3 The measurement starting of the different cells in 10.2 may correspond to different threshold conditions.

10.4. The measurement starting of the different cells in 10.2 are configured at the same time. When the corresponding condition is met, the corresponding measurement is started.

In an embodiment of the present disclosure, according to the trigger prediction set and the corresponding prediction threshold configured by the network, the UE may obtain the prediction value corresponding to the trigger prediction set through the AI prediction function, determine whether the corresponding prediction threshold requirement is met based on the prediction result and the configuration by the network, and trigger the starting of the cell measurement for the serving cell/the non-serving cell/the cell with the given frequency point if the prediction threshold requirement is met.

11. The prediction result type in 3, that is, the type of the prediction result, may include but is not limited to one or more of the following information;

First type; output result of the UE's own characteristic and management.

11.1. a probability of occurrence of a high-traffic service for the UE within a certain period of time.

11.2 a probability of occurrence of a low-latency service for the UE within a certain period of time.

11.3 a motion trajectory and a movement direction of the UE within a certain period of time.

11.4 a QoS requirement of the UE within a certain period of time.

11.5 a QoE requirement of the UE within a certain period of time.

Second type; an output result of the UE regarding continuing to reside on the serving cell.

11.6. a probability of occurrence of a radio link failure for the UE within a certain period of time.

11.7 a probability of occurrence of interruption and call drop for the UE within a certain period of time.

11.8 a probability of occurrence of QoS/QoE failing to meet a UE's requirement within a certain period of time.

11.9 a probability that the UE can continue to reside on the serving cell within a certain period of time.

11.10 a possible average signal quality/peak signal quality/minimum signal quality of the serving cell where the UE continues to reside on within a certain period of time, here, the signal quality may include; RSRP/RSRQ/SINR.

11.11 a possible average rate/peak rate/minimum rate of the serving cell where the UE continues to reside on within a certain period of time.

11.12 a possible average transmission delay/minimum transmission delay/maximum transmission delay of the serving cell where the UE continues to reside on within a certain period of time.

11.13. comprehensively considering various output results (including but not limited to the above output results) to obtain a recommendation to continue to reside on the serving cell.

Second type; UE's prediction for a performance after accessing a certain neighbor cell.

11.14 a probability of occurrence of handover failure when the UE accesses the neighbor cell.

11.15 a probability of occurrence of ping-pong when the UE selects to access the neighbor cell.

11.16 a probability of occurrence of interruption or call drop if the UE accesses the neighbor cell within a certain period of time.

11.17 a probability of occurrence of QoS/QoE failing to meet the UE's requirement if the UE accesses the neighbor cell within a certain period of time.

11.18 a probability that the UE can continue to reside on the neighbor cell if the UE accesses the neighbor cell within a certain period of time.

11.19 a possible average signal quality/peak signal quality/minimum signal quality if the UE accesses the neighbor cell within a certain period of time, here, the signal quality may include; RSRP/RSRQ/SINR.

11.20 a possible average rate/peak rate/minimum rate if the UE accesses the neighbor cell within a certain period of time.

11.21 a possible average transmission delay/minimum transmission delay/maximum transmission delay if the UE accesses the neighbor cell within a certain period of time.

Figure 4:
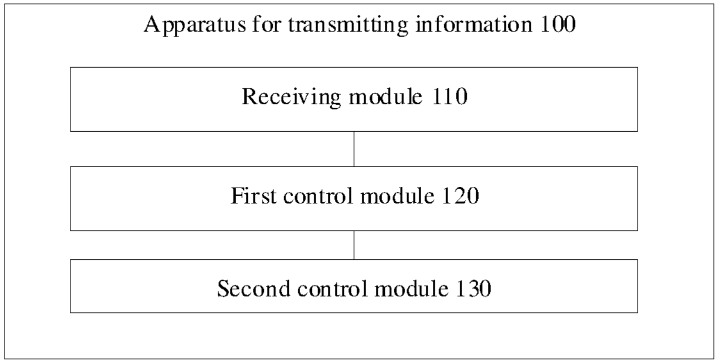
FIG. 4 illustrates a block diagram of an apparatus for transmitting information according to an embodiment of the present disclosure.

An embodiment of the present disclosure further provides an apparatus for transmitting information, which is applied to a UE in wireless communication. As shown in FIG. 4, the apparatus 100 for transmitting the information includes:

a receiving module 110, configured to receive control information, the control information is at least configured to control an operation of a first prediction model in the UE, and the first prediction model is configured to obtain a prediction result of RRM.

In an embodiment of the present disclosure, the control information includes:

a control instruction, after the control instruction is received by the UE, starting or stopping of the first prediction model is controlled by the UE; and/or configuration information, including threshold information for controlling the starting and/or the stopping of the first prediction model.

In an embodiment of the present disclosure, the threshold information indicates at least one of:

a time threshold, including a time threshold for the starting of the first prediction model and/or a time threshold for the stopping of the first prediction model;

a position threshold, including a position threshold for the starting of the first prediction model and/or a position threshold for the stopping of the first prediction model;

a movement speed threshold, including a movement speed threshold for the starting of the first prediction model and/or a movement speed threshold for the stopping of the first prediction model;

a signal quality threshold, including a signal quality threshold for the starting of the first prediction model and/or a signal quality threshold for the stopping of the first prediction model; and a prediction threshold, including a prediction threshold for the starting of the first prediction model and/or a prediction threshold for the stopping of the first prediction model, and the prediction threshold is configured to be compared with a prediction value of a second prediction model.

In an embodiment of the present disclosure, the time threshold includes at least one of:

a time point threshold; and a time range threshold.

In an embodiment of the present disclosure, the position threshold includes: a distance threshold between the UE and a first reference position.

In an embodiment of the present disclosure, the signal quality threshold includes at least one of:

a signal quality threshold in a first time domain range;

a signal quality change threshold in the first time domain range;

a signal quality threshold of at least one cell; and a signal quality threshold of at least one type.

In an embodiment of the present disclosure, the prediction value of the second prediction model is determined by running the second prediction model by the UE based on a prediction value type in a first prediction type set.

In an embodiment of the present disclosure, the first prediction type set includes at least one prediction value type of at least one prediction object.

In an embodiment of the present disclosure, the apparatus further includes one of:

a first control module 120, configured to control the first prediction model to start in response to the second prediction model not being started; and a second control module 130, configured to control the first prediction model to stop in response to the second prediction model not being started.

In an embodiment of the present disclosure, the prediction threshold is used for the UE to compare with the prediction value of the second prediction model, and control, based on a comparison result, starting and/or stopping of cell measurement for a first cell.

In an embodiment of the present disclosure, the prediction result is determined, by the first prediction model run by the UE, based on a prediction result type in a second prediction type set.

In an embodiment of the present disclosure, the second prediction type set includes at least one prediction result type of at least one prediction object.

In an embodiment of the present disclosure, the receiving module 110 is configured to receive a control instruction carrying indication information indicating the second prediction type set, and the control instruction indicates the UE to control starting or stopping of the first prediction model.

In an embodiment of the present disclosure, the prediction result includes at least one of:

a prediction result associated with UE's own RRM;

a prediction result of RRM of a serving cell where the UE is located; and a prediction result of RRM of at least one neighbor cell of the UE. the prediction results include at least one of:

In an embodiment of the present disclosure, the apparatus further includes:

a third control module, further configured to control the first prediction model to stop prediction for a predetermined prediction result type of a second cell, in response to the UE handing over from a serving cell to a target cell.

Figure 5:
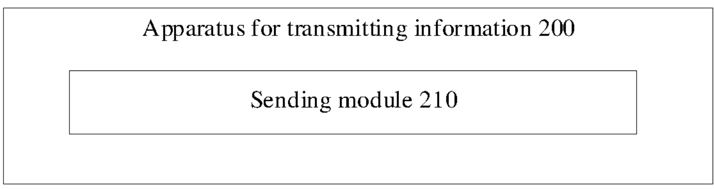
FIG. 5 illustrates a block diagram of another apparatus for transmitting information according to an embodiment of the present disclosure.

An embodiment of the present disclosure further provides an apparatus for transmitting information, which is applied to an access network device in wireless communication. As shown in FIG. 5, the apparatus 200 for transmitting the information includes:

a sending module 210, configured to send control information, and the control information is at least configured to control an operation of a first prediction model in a UE, and the first prediction model is configured to obtain a prediction result of RRM.

In an embodiment of the present disclosure, the control information includes:

a control instruction, after the control instruction is received by the UE, starting or stopping of the first prediction model is controlled by the UE; and/or configuration information, including threshold information for controlling the starting and/or the stopping of the first prediction model.

In an embodiment of the present disclosure, the threshold information indicates at least one of:

a time threshold, including a time threshold for the starting of the first prediction model and/or a time threshold for the stopping of the first prediction model;

a position threshold, including a position threshold for the starting of the first prediction model and/or a position threshold for the stopping of the first prediction model;

a movement speed threshold, including a movement speed threshold for the starting of the first prediction model and/or a movement speed threshold for the stopping of the first prediction model;

a signal quality threshold, including a signal quality threshold for the starting of the first prediction model and/or a signal quality threshold for the stopping of the first prediction model; and a prediction threshold, including a prediction threshold for the starting of the first prediction model and/or a prediction threshold for the stopping of the first prediction model, and the prediction threshold is configured to be compared with a prediction value of a second prediction model.

In an embodiment of the present disclosure, the time threshold includes at least one of:

a time point threshold; and a time range threshold.

In an embodiment of the present disclosure, the position threshold includes: a distance threshold between the UE and a first reference position.

In an embodiment of the present disclosure, the signal quality threshold includes at least one of:

a signal quality threshold in a first time domain range;

a signal quality change threshold in the first time domain range;

a signal quality threshold of at least one cell; and a signal quality threshold of at least one type.

In an embodiment of the present disclosure, the prediction value of the second prediction model is determined by running the second prediction model by the UE based on a prediction value type in a first prediction type set.

In an embodiment of the present disclosure, the first prediction type set includes at least one prediction value type of at least one prediction object.

In an embodiment of the present disclosure, the prediction threshold is used for the UE to compare with the prediction value of the second prediction model, and control, based on a comparison result, starting and/or stopping of cell measurement for a first cell.

In an embodiment of the present disclosure, the prediction result is determined, by the first prediction model run by the UE, based on a prediction result type in a second prediction type set.

In an embodiment of the present disclosure, the second prediction type set includes at least one prediction result type of at least one prediction object.

In an embodiment of the present disclosure, the sending module 210 is further configured to send a control instruction carrying indication information indicating the second prediction type set, and the control instruction indicates the UE to control starting or stopping of the first prediction model.

In an embodiment of the present disclosure, the prediction result includes at least one of:

a prediction result associated with UE's own RRM;

a prediction result of RRM of a serving cell where the UE is located; and a prediction result of RRM of at least one neighbor cell of the UE.

the prediction results include at least one of:

In an embodiment of the present disclosure, the receiving module 110, the first control module 120, the second control module 130, the sending module 210, etc. may be implemented by one or more Central Processing Units (CPUs), Graphics Processing Units (GPUs), baseband processors (BPs), Application Specific Integrated Circuits (ASICs), digital signal processors (DSPs), Programmable Logic Devices (PLDs), Complex Programmable Logic Devices (CPLDs), Field-Programmable Gate Arrays (FPGAs), general purpose processors, controllers, Micro Controller Units (MCUs), Microprocessors, or other electronic elements, for performing the aforementioned method.

Figure 6:
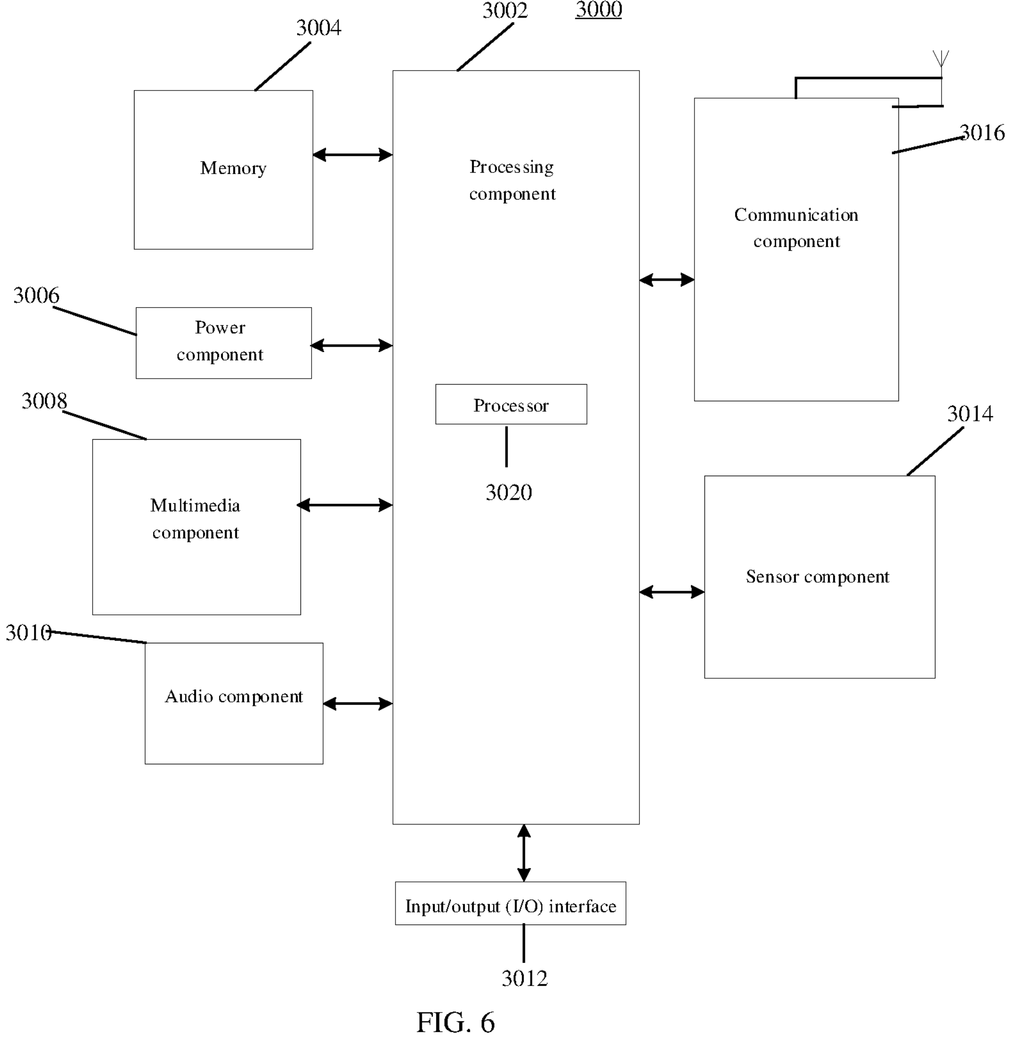
FIG. 6 illustrates a block diagram of a device for transmitting information according to an embodiment of the present disclosure.

FIG. 6 illustrates a block diagram of a device 3000 for transmitting information according to an embodiment of the present disclosure. For example, the device 3000 may be a mobile phone, a computer, a digital broadcast user device, a messaging device, a gaming console, a tablet device, a medical device, an exercise device, a personal digital assistant, etc.

Referring to FIG. 6, the device 3000 may include one or more of the following components; a processing component 3002, a memory 3004, a power component 3006, a multimedia component 3008, an audio component 3010, an input/output (I/O) interface 3012, a sensor component 3014, and a communication component 3016.

The processing component 3002 typically controls overall operations of the device 3000, such as the operations associated with display, telephone calls, data communications, camera operations, and recording operations. The processing component 3002 may include one or more processors 3020 to execute instructions to perform all or part of the steps in the above described methods. Moreover, the processing component 3002 may include one or more modules which facilitate the interaction between the processing component 3002 and other components. For instance, the processing component 3002 may include a multimedia module to facilitate the interaction between the multimedia component 3008 and the processing component 3002.

The memory 3004 is configured to store various types of data to support the operation of the device 3000. Examples of such data include instructions for any applications or methods operated on the device 3000, contact data, phonebook data, messages, pictures, video, etc. The memory 3004 may be implemented using any type of volatile or non-volatile memory apparatuses, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 3006 provides power to various components of the device 3000. The power component 3006 may include a power management system, one or more power sources, and any other components associated with the generation, management, and distribution of power in the device 3000.

The multimedia component 3008 includes a screen providing an output interface between the device 3000 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 3008 includes a front camera and/or a rear camera. The front camera and the rear camera may receive an external multimedia datum while the device 3000 is in an operation mode, such as a photographing mode or a video mode. Each of the front camera and the rear camera may be a fixed optical lens system or have focus and optical zoom capability.

The audio component 3010 is configured to output and/or input audio signals. For example, the audio component 3010 includes a microphone (MIC) configured to receive an external audio signal when the device 3000 is in an operation mode, such as a call mode, a recording mode, and a voice recognition mode. The received audio signal may be further stored in the memory 3004 or transmitted via the communication component 3016. In some embodiments, the audio component 3010 further includes a speaker to output audio signals.

The I/O interface 3012 provides an interface between the processing component 3002 and peripheral interface modules, such as a keyboard, a click wheel, buttons, and the like.

The buttons may include, but are not limited to, a home button, a volume button, a starting button, and a locking button.

The sensor component 3014 includes one or more sensors to provide state assessments of various aspects of the device 3000. For instance, the sensor component 3014 may detect an open/closed state of the device 3000, relative positioning of components, e.g., the display and the keypad, of the device 3000, a change in position of the device 3000 or a component of the device 3000, a presence or absence of user contact with the device 3000, an orientation or an acceleration/deceleration of the device 3000, and a change in temperature of the device 3000. The sensor component 3014 may include a proximity sensor configured to detect the presence of nearby objects without any physical contact. The sensor component 3014 may also include a light sensor, such as a CMOS or CCD image sensor, for use in imaging applications. In some embodiments, the sensor component 3014 may also include an accelerometer sensor, a gyroscope sensor, a magnetic sensor, a pressure sensor, or a temperature sensor.

The communication component 3016 is configured to facilitate communication, wired or wirelessly, between the device 3000 and other devices. The device 3000 may access a wireless network based on a communication standard, such as WiFi, 2G, or 3G, or a combination thereof. In an embodiment, the communication component 3016 receives a broadcast signal or broadcast associated information from an external broadcast management system via a broadcast channel. In an embodiment, the communication component 3016 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In an embodiment of the present disclosure, the device 3000 may be implemented with one or more application specific integrated circuits (ASICs), digital signal processors (DSPs), digital signal processing devices (DSPDs), programmable logic devices (PLDs), field programmable gate arrays (FPGAs), controller, micro-controller, microprocessors, or other electronic components, for performing the above described methods.

In an embodiment of the present disclosure, there is further provided a non-transitory computer readable storage medium including instructions, such as the memory 3004 including instructions, the above instructions may be executed by the processor 3020 in the device 3000 for performing the above-described methods. For example, the non-transitory computer-readable storage medium may be a ROM, a Random Access Memory (RAM), a CD-ROM, a magnetic tape, a floppy disc, an optical data storage device, and the like.

Other implementations of embodiments of the present disclosure will be apparent to those skilled in the art from consideration of the specification and practice of the present disclosure disclosed here. The present disclosure is intended to cover any variations, uses, or adaptations of embodiments of the present disclosure following the general principles thereof and including the common general knowledge or habitual technical means in the technical field not disclosed in embodiments of the present disclosure. The specification and embodiments are considered as exemplary only, and a true scope and spirit of embodiments of the present disclosure is indicated by the appending claims.

It will be appreciated that embodiments of the present disclosure are not limited to the exact construction that has been described above and illustrated in the accompanying drawings, and that various modifications and changes may be made without departing from the scope thereof. It is intended that the scope of embodiments of the present disclosure only be limited by the appended claims.

What is claimed is:

1. A method for transmitting information, performed by a User Equipment (UE), and comprising:

receiving control information, wherein the control information is at least configured to control an operation of a first prediction model in the UE, and the first prediction model is configured to obtain a prediction result of Radio Resource Management (RRM);

wherein the control information comprises configuration information comprising threshold information for controlling starting or stopping of the first prediction model;

wherein the threshold information indicates a signal quality threshold, comprising at least one of a signal quality threshold for the starting of the first prediction model or a signal quality threshold for the stopping of the first prediction model.

2. The method according to claim 1, wherein the control information further comprises:

a control instruction, wherein upon being received by the UE, the control instruction is configured to control the starting or the stopping of the first prediction model.

3. The method according to claim 1, wherein the threshold information further indicates at least one of:

a time threshold, comprising at least one of a time threshold for the starting of the first prediction model or a time threshold for the stopping of the first prediction model;

a position threshold, comprising at least one of a position threshold for the starting of the first prediction model or a position threshold for the stopping of the first prediction model;

a movement speed threshold, comprising at least one of a movement speed threshold for the starting of the first prediction model or a movement speed threshold for the stopping of the first prediction model;

or a prediction threshold, comprising at least one of a prediction threshold for the starting of the first prediction model or a prediction threshold for the stopping of the first prediction model, wherein the prediction threshold is configured to be compared with a prediction value of a second prediction model.

4. The method according to claim 3, wherein:

the time threshold comprises at least one of:

a time point threshold; or a time range threshold;

the position threshold comprises:

a distance threshold between the UE and a first reference position; and the signal quality threshold comprises at least one of:

a signal quality threshold in a first time domain range;

a signal quality change threshold in the first time domain range;

a signal quality threshold of at least one cell; or a signal quality threshold of at least one type.

5. The method according to claim 3, wherein:

the prediction value of the second prediction model is determined by running the second prediction model by the UE based on a prediction value type in a first prediction type set;

the first prediction type set comprises at least one prediction value type of at least one prediction object; and the method further comprises one of:

controlling the first prediction model to start in response to the second prediction model not being started; and controlling the first prediction model to stop in response to the second prediction model not being started.

6. The method according to claim 3, wherein the prediction threshold is used for the UE to compare with the prediction value of the second prediction model, and control, based on a comparison result, starting and/or stopping of cell measurement for a first cell.

7. The method according to claim 1, further comprising:

receiving a control instruction carrying indication information indicating a second prediction type set, wherein the control instruction indicates the UE to control starting or stopping of the first prediction model; and determining the prediction result, by the first prediction model run by the UE, based on a prediction result type in a second prediction type set, wherein the second prediction type set comprises at least one prediction result type of at least one prediction object.

8. The method according to claim 1, wherein the prediction result comprises at least one of:

a prediction result associated with UE's own RRM;

a prediction result of RRM of a serving cell where the UE is located; or a prediction result of RRM of at least one neighbor cell of the UE.

9. The method according to claim 1, comprising:

controlling the first prediction model to stop prediction for a predetermined prediction result type of a second cell, in response to the UE handing over from a serving cell to a target cell.

10. A method for transmitting information, performed by an access network device, and comprising:

sending control information, wherein the control information is at least configured to control an operation of a first prediction model in a User Equipment (UE), and the first prediction model is configured to obtain a prediction result of Radio Resource Management (RRM);

wherein the control information comprises configuration information, comprising threshold information for controlling starting or stopping of the first prediction model;

wherein the threshold information indicates a signal quality threshold, comprising at least one of a signal quality threshold for the starting of the first prediction model or a signal quality threshold for the stopping of the first prediction model.

11. The method according to claim 10, wherein the control information further comprises:

a control instruction, wherein upon being received by the UE, the control instruction is configured to control the starting or the stopping of the first prediction model.

12. The method according to claim 10, wherein the threshold information further indicates at least one of:

a time threshold, comprising at least one of a time threshold for the starting of the first prediction model or a time threshold for the stopping of the first prediction model;

a position threshold, comprising at least one of a position threshold for the starting of the first prediction model or a position threshold for the stopping of the first prediction model;

a movement speed threshold, comprising at least one of a movement speed threshold for the starting of the first prediction model or a movement speed threshold for the stopping of the first prediction model;

or a prediction threshold, comprising at least one of a prediction threshold for the starting of the first prediction model or a prediction threshold for the stopping of the first prediction model, wherein the prediction threshold is configured to be compared with a prediction value of a second prediction model.

13. The method according to claim 12, wherein:

the time threshold comprises at least one of:

a time point threshold; or a time range threshold;

the position threshold comprises:

a distance threshold between the UE and a first reference position; and the signal quality threshold comprises at least one of:

a signal quality threshold in a first time domain range;

a signal quality change threshold in the first time domain range;

a signal quality threshold of at least one cell; or a signal quality threshold of at least one type.

14. The method according to claim 12, wherein the prediction value of the second prediction model is determined by running the second prediction model by the UE based on a prediction value type in a first prediction type set; and wherein the first prediction type set comprises at least one prediction value type of at least one prediction object.

15. The method according to claim 12, wherein the prediction threshold is used for the UE to compare with the prediction value of the second prediction model, and control, based on a comparison result, starting and/or stopping of cell measurement for a first cell.

16. The method according to claim 10, further comprising:

sending a control instruction carrying indication information indicating a second prediction type set, wherein the control instruction indicates the UE to control starting or stopping of the first prediction model;

wherein the prediction result is determined, by the first prediction model run by the UE, based on a prediction result type in the second prediction type set; and the second prediction type set comprises at least one prediction result type of at least one prediction object.

17. The method according to claim 10, wherein the prediction result comprises at least one of:

a prediction result associated with UE's own RRM;

a prediction result of RRM of a serving cell where the UE is located; or a prediction result of RRM of at least one neighbor cell of the UE.

18. A communication device, comprising:

a processor; and a memory storing a program executable by the processor, wherein the processor is configured to:

receive control information, wherein the control information is at least configured to control an operation of a first prediction model in a User Equipment (UE), and the first prediction model is configured to obtain a prediction result of Radio Resource Management (RRM);

wherein the control information comprises configuration information, comprising threshold information for controlling starting or stopping of the first prediction model;

wherein the threshold information indicates a signal quality threshold, comprising at least one of a signal quality threshold for the starting of the first prediction model or a signal quality threshold for the stopping of the first prediction model.

19. A communication device, comprising:

a processor; and a memory storing a program executable by the processor, wherein the processor is configured to perform the method according to claim 10.

* * * * *